United States Patent
Edge

(10) Patent No.: US 8,340,627 B2
(45) Date of Patent: Dec. 25, 2012

(54) SUPPORT OF VOICE CALL CONTINUITY (VCC) FOR WIRELESS EMERGENCY CALLS

(75) Inventor: Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 12/346,645

(22) Filed: Dec. 30, 2008

(65) Prior Publication Data

US 2010/0124897 A1 May 20, 2010

Related U.S. Application Data

(60) Provisional application No. 61/019,103, filed on Jan. 4, 2008.

(51) Int. Cl.
- *H04W 4/22* (2009.01)
- *H04W 36/00* (2009.01)
- *H04L 12/66* (2006.01)

(52) U.S. Cl. ............ 455/404.1; 455/436; 370/331; 370/352

(58) Field of Classification Search ........... 455/404.1, 455/404.2, 436; 370/331
See application file for complete search history.

(56) References Cited

U.S. PATENT DOCUMENTS

| | | | |
|---|---|---|---|
| 2005/0009499 A1* | 1/2005 | Koster | 455/404.1 |
| 2005/0014481 A1 | 1/2005 | Chin et al. | |
| 2006/0030290 A1* | 2/2006 | Rudolf et al. | 455/404.1 |
| 2006/0276168 A1* | 12/2006 | Fuller et al. | 455/404.2 |
| 2007/0014281 A1* | 1/2007 | Kant | 370/352 |
| 2007/0060097 A1* | 3/2007 | Edge et al. | 455/404.1 |
| 2007/0149166 A1* | 6/2007 | Turcotte et al. | 455/404.1 |
| 2007/0217354 A1* | 9/2007 | Buckley | 370/328 |
| 2007/0254625 A1 | 11/2007 | Edge | |
| 2008/0123625 A1* | 5/2008 | Buckley | 370/352 |
| 2008/0267171 A1* | 10/2008 | Buckley et al. | 370/352 |
| 2009/0080382 A1* | 3/2009 | Chen et al. | 370/331 |

(Continued)

FOREIGN PATENT DOCUMENTS

JP 2005039821 A 2/2005

(Continued)

OTHER PUBLICATIONS

3GPP: "3rd Generation Partnership Project; Technical Specification Group Services and System Aspects; Feasibility Study on Voice Call Continuity Suipport for Emergency Calls (Release 8)" 3GPP Draft; 23826-030-Diffmarked, 3rd Generation Partnership Project (3GPP), Mobile Competence Centre; 650, Route Des Lucioles; F-06921 Sophia-Antipolis Cedex; France, Nov. 19, 2007, XP050262527 abstract, p. 8, paragraph 6.—p. 40, paragraph 6.3.4.4. (3GPP TR 23.826 V0.3.0 (Nov. 2007).

(Continued)

*Primary Examiner* — George Eng
*Assistant Examiner* — Tangela T. Chambers
(74) *Attorney, Agent, or Firm* — Darren M Simom

(57) ABSTRACT

Apparatus and methods to support Voice Call Continuity (VCC) for emergency calls in a wireless access environment are operable to receive, at a serving domain, a message containing emergency and domain transfer information from a user equipment (UE). The apparatus and methods are further operable to determine a need for emergency call origination or domain transfer based on the emergency and domain transfer information. Additionally, the apparatus and methods are operable to perform the emergency call origination or the domain transfer based on the determining.

47 Claims, 14 Drawing Sheets

U.S. PATENT DOCUMENTS

2009/0310597 A1* 12/2009 Song et al. .................... 370/352
2009/0323636 A1* 12/2009 Dillon et al. .................. 370/352
2010/0111002 A1* 5/2010 Xu et al. ....................... 370/352

FOREIGN PATENT DOCUMENTS

| JP | 2009509423 | 3/2009 |
| JP | 2009522964 A | 6/2009 |
| JP | 2009524977 A | 7/2009 |
| JP | 2009535944 A | 10/2009 |
| WO | WO2007035736 | 3/2007 |
| WO | WO2007072462 | 6/2007 |
| WO | WO2007079579 A1 | 7/2007 |
| WO | WO2007091802 A1 | 8/2007 |
| WO | WO2007127991 | 11/2007 |

OTHER PUBLICATIONS

3GPP: "Voice call continuity between CS and IMS study—TR 23.806 V7.0.0 (Dec. 2005)" XP002438622, abstract, p. 16, paragraph 6.—p. 93, paragraph 6.5.8.

International Search Report and Written Opinion—PCT/US2009/030008, International Search Authority—European Patent Office, Apr. 23, 2009.

"3rd Generation Partnership Project;Technical Specification Group Services and System Aspects;IP Multimedia subsystem emergency sessions (Release 7)",3GPP TS 23.167 V7.7.0, Dec. 2007.

* cited by examiner

SUPPORT OF VOICE CALL CONTINUITY (VCC) FOR WIRELESS EMERGENCY CALLS

CLAIM OF PRIORITY UNDER 35 U.S.C. §119

The present Application for Patent claims priority to Provisional Application No. 61/019,103 entitled "IMPROVED SUPPORT OF VOICE CALL CONTINUITY (VCC) FOR WIRELESS EMERGENCY CALLS" filed Jan. 4, 2008, and assigned to the assignee hereof and hereby expressly incorporated by reference herein.

REFERENCE TO CO-PENDING APPLICATIONS FOR PATENT

The present Application for Patent is related to co-pending U.S. patent application Ser. No. 11/740,220 entitled "SYSTEM AND METHOD FOR SUPPORTING VOICE CALL CONTINUITY FOR VOIP EMERGENCY CALLS" filed Apr. 25, 2007, assigned to the assignee hereof, and expressly incorporated by reference herein.

BACKGROUND

1. Field

The described aspects relate to support of Voice Call Continuity (VCC) for IP Multimedia Subsystem (IMS) emergency calls (e.g. E911 calls in North America or E112 calls in Europe) made using Voice over IP (VoIP).

2. Background

Voice Call Continuity (VCC) is a feature that is being evaluated by the Third Generation Partnership Project (3GPP) and by the Third Generation Partnership Project 2 (3GPP2). A definition of VCC has been produced by 3GPP in 3GPP TS 23.206 ("Voice Call Continuity (VCC) between Circuit Switched (CS) and IP Multimedia Subsystem (IMS); Stage 2") and in 3GPP TS 23.237 ("IP Multimedia Subsystem (IMS) Service Continuity; Stage 2") which are publicly available documents. A definition of VCC has also been produced by 3GPP2 in 3GPP2 X.S0042-A ("Voice Call Continuity between IMS and Circuit Switched Systems") which is also a publicly available document. Both definitions of VCC are very similar and support continuity of a voice call that was previously established between a wireless terminal and any other device (wireless or non-wireless) when the wireless terminal switches between using a wireless access that supports circuit mode and a wireless access that supports VoIP. In particular, use of VCC reduces the need for releasing a call (e.g. a circuit mode call) and re-establishing a call (e.g. using VoIP) when the user switches access which may cause significant delay and disturbance to the users involved in the call and might result in an inability to re-establish the call.

Examples of wireless access networks that support circuit mode, sometimes referred to as the circuit switched (CS) domain, include the Global System for Mobile Communications (GSM), Universal Mobile Telecommunication System (UMTS) using wideband code division multiple access (W-CDMA) and cdma2000 1X. Examples of wireless access networks that support VoIP include UMTS W-CDMA, cdma2000 1xEV-DO (Evolution Data Optimized) and various wireless LAN (WLAN) networks. In some cases, the same access network (e.g. UMTS W-CDMA) can support both circuit mode and VoIP, although the user's wireless terminal would be required to use just one of them (at any one time) for a particular call.

In the "Voice Call Continuity between CS and IMS" stage 2, 3GPP draft TS 23.206 in Release 7, VCC is mainly supported in a new entity that may be part of the IP Multimedia Subsystem (IMS) in a network and that has been assigned several different names over the course of developing the current solution. In an early version of 3GPP TS 23.206, this entity was known as a VCC call continuity control function (CCCF). In the latest version of TS 23.206 it is called a VCC Application or Domain Transfer Function (DTF). In 3GPP TS 23.237, it is called a Service Centralization and Continuity Application Server (SCC AS). In 3GPP2 X.S0042-A ("Voice Call Continuity between IMS and Circuit Switched Systems—Stage 2"), VCC is supported by an entity similar to these 3GPP entities known as a VCC Application Server (VCC AS). The 3GPP VCC CCCF, 3GPP VCC Application, 3GPP SCC AS and 3GPP2 VCC AS are all defined to be located in the calling wireless user's home network, which is generally incompatible with the current solution for VoIP IMS Emergency calls defined in 3GPP TS 23.167 for Release 7 and Release 8 and with the similar 3GPP2 solution defined in 3GPP2 X.S0049 where IMS VoIP emergency call support is restricted to the visited network. This means that it will generally not be possible to support VCC for IMS Emergency calls unless a new method of VCC is defined for the visited network or unless IMS emergency calls are routed through the home network. Exemplary embodiments of the invention uses the former alternative since home network support of IMS Emergency calls would significantly change the current solution for VoIP emergency calls as well as introduce a number of new problems such as liability issues, support of visited country regulatory requirements and possibly latency issues. Such a home network based solution would also be incompatible with supporting IMS emergency calls from unauthorized users.

Some alternative solutions to support VCC for wireless emergency calls have been defined by 3GPP in TR 23.826. Some problems with these solutions are as follows: (a) it may be difficult for a serving network to know whether a UE originating an emergency call supports VCC and to distinguish between a new emergency call from the UE and a request for domain transfer for an existing emergency call for the UE; (b) it may be difficult, complex and/or expensive to convey any indication obtained by a network MSC related to (a) to any GMLC involved in supporting the call; and (c) the support of VCC for emergency calls by the UE and by an MSC should preferably require little or no new impact.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The aspects described herein address one or more of the above problems. For example, scenario (a) above may be addressed by extending the existing Service Category parameter in an Emergency Setup message by allocating currently unused bits to indicate that a UE supports VCC and/or that the UE is originating a new emergency call versus requesting a domain transfer for an existing call. Scenario (b) may be addressed by assigning a network GMLC multiple SCCP E.164 addresses and using different E.164 addresses in any MAP query directed to the GMLC to distinguish whether the UE associated with the query supports VCC and/or whether the query is for a new emergency call versus an existing emergency call for which a domain transfer is requested.

Additionally, scenario (c) may be addressed by having a serving network provide a UE with a modified VDN (E.164 Voice Domain Transfer Number) and VDI (Voice Domain Transfer SIP URI) that will be used by the UE later to request domain transfer and that will be recognized by the network as a request for domain transfer for an existing emergency call.

In an aspect, a method to support Voice Call Continuity (VCC) for emergency calls in a wireless access environment comprises receiving, at a serving domain, a message containing emergency and domain transfer information from a user equipment (UE). The method also comprises determining a need for emergency call origination or domain transfer based on the emergency and domain transfer information. Additionally, the method comprises performing the emergency call origination or the domain transfer based on the determining.

The emergency and domain transfer information may comprise a modified VDN or a modified VDI. Alternatively, or in addition, the emergency and domain transfer information may indicate that the UE can support Voice Call Continuity (VCC).

The message may be a 3GPP DTAP Emergency SETUP message and the emergency and domain transfer information comprise spare bits in an optional Service Category parameter. Alternatively, the message may be a 3GPP DTAP SETUP message and the modified VDN is an E.164 number in the Called Party Number parameter. Further, the message may be a SIP INVITE and the modified VDI is a SIP URI.

The serving domain may be a circuit-switched (CS) serving domain or a packet-switched (PS) domain.

Further, the message may be received in a serving MSC in the serving domain, wherein the serving MSC sends a query to a GMLC in the serving domain, wherein the query includes an emergency call origination request or a domain transfer request, wherein the GMLC returns routing information to the serving MSC based on the emergency call origination or the domain transfer request. Further, the GMLC may possess two SCCP E.164 addresses, wherein the serving MSC sends the query to one address if the emergency and domain transfer information indicates an emergency call origination and to the other address if the emergency and domain transfer information indicates a domain transfer, wherein the one address indicates the emergency call origination and the other address indicates the domain transfer request. Also, the GMLC may determine the routing information based on which SCCP address the query was sent to. Further, the routing information may comprise an ESRD or an ESRK. Moreover, the sending of the query to the GMLC and the receipt of the routing information from the GMLC may be transparent to the serving MSC.

The above-noted query may be a MAP SLR and the emergency call origination or domain transfer request may be included in an optional parameter of the MAP SLR.

The performing of the emergency call origination may include anchoring the emergency call in a VCC DTF. Also, the VCC DTF may return a modified VDI and a modified VDN to the UE. The modified VDI and the modified VDN may be returned to the UE in a SIP 200 OK message.

The performing of the domain transfer may include finding a call record for the UE in a VCC DTF. Also, the method may include returning an error message to the UE if the call record is not found.

If the serving domain is the CS serving domain, the method may further comprise including a serving cell ID or MSC identity in an ISUP Initial Address Message (IAM) used to perform the Domain Transfer. The serving cell ID or MSC identity may be included in a Generic Digits parameter in the IAM.

In another aspect, at least one processor configured to support Voice Call Continuity (VCC) for emergency calls in a wireless access environment comprises a first module for receiving a message containing emergency and domain transfer information from a user equipment (UE). The at least one processor also comprises a second module for determining a need for emergency call origination or domain transfer based on the emergency and domain transfer information, and a third module for performing the emergency call origination or the domain transfer based on the determining.

In a further aspect, a computer program product configured to support Voice Call Continuity (VCC) for emergency calls in a wireless access environment comprises a computer-readable medium having a plurality of codes. The codes comprise a first set of codes operable to cause a computer to receive a message containing emergency and domain transfer information from a user equipment (UE). The codes also comprise a second set of codes operable to cause the computer to determine a need for emergency call origination or domain transfer based on the emergency and domain transfer information. Additionally, the codes comprise a third set of codes operable to cause the computer to perform the emergency call origination or the domain transfer based on the determining.

In another aspect, an apparatus configured to support Voice Call Continuity (VCC) for emergency calls in a wireless access environment comprises means for receiving a message containing emergency and domain transfer information from a user equipment (UE). The apparatus also comprises means for determining a need for emergency call origination or domain transfer based on the emergency and domain transfer information. Additionally, the apparatus comprises means for performing the emergency call origination or the domain transfer based on the determining.

In still another aspect, an apparatus to support Voice Call Continuity (VCC) for emergency calls in a wireless access environment comprises at least one processor operable to execute instructions to: receive, at a serving domain, a message containing emergency and domain transfer information from a user equipment (UE); determine a need for emergency call origination or domain transfer based on the emergency and domain transfer information; and perform the emergency call origination or the domain transfer based on the determining.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

For the purposes of the present document, the abbreviations given in 3GPP Technical Report 23.826 (TR 23.826), 3GPP Technical Specification 23.206 (TS 23.206), 3GPP Technical Specification 23.167 (TS 23.167), 3GPP Technical Specification 23.271 (TS 23.271) each of which is hereby incorporated by reference herein, and the following apply. For the purposes of the present document, the following abbreviations apply and take precedence: VCC means Voice Call Continuity; I-WLAN means Interworking WLAN; WLAN means Wireless Local Area Network; ICCF means IMS CS Control Function; RUA means Remote User Agent; E-RUA means Emergency RUA; and SLR means Subscriber Location Report.

The described aspects provide improved support of VCC for wireless emergency calls. In one aspect, such support may include extending the existing Service Category parameter in an Emergency Setup message by allocating currently unused bits to indicate that a UE supports VCC and/or that the UE is originating a new emergency call versus requesting a domain transfer for an existing call. For example, the present aspects allow for an explicit indication of VCC support in call establishment and/or registration related messages, such as a SIP INVITE or DTAP SETUP or DTAP EMERGENCY SETUP message. In another aspect, support of VCC for a wireless emergency call may include assigning a network GMLC multiple SCCP E.164 addresses and using different E.164 addresses in any MAP query directed to the GMLC to distinguish whether the UE associated with the query supports VCC and/or whether the query is for a new emergency call versus an existing emergency call for which a domain transfer is requested. Additionally, in a further aspect, support of VCC for a wireless emergency call may include a serving network providing a UE with a modified VDN and VDI that will be used by the UE later to request domain transfer and that will be recognized by the network as a request for domain transfer for an existing emergency call. These aspects may be implemented individually, or in any combination. Accordingly, the present aspects allow an originating call to be distinguished from a request for domain transfer, which enables procedures, described below, for domain transfer that reuse parts of the procedures for an emergency call origination to be made more reliable and improves overall efficiency by avoiding VCC resource allocation and transcoding use for emergency calls from non-VCC capable UEs.

I. Wireless Communication System

Figure 1:
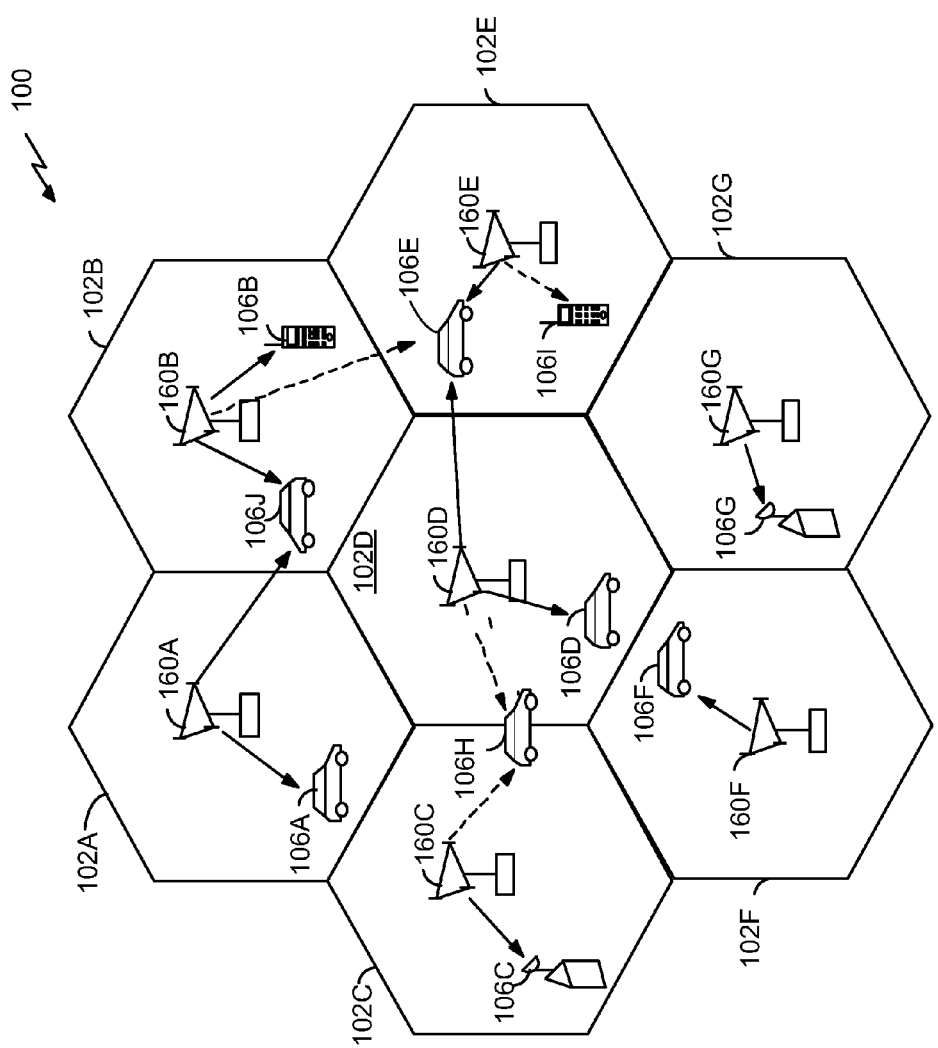
FIG. 1 is a schematic diagram of one aspect of an exemplary communications system 100 that supports a number of users and is capable of implementing at least some aspects described herein.

Referring to FIG. 1, an example of a cellular communication system 100 operable to implement the described apparatus and methods includes one or more cells 102A-102G that each include a corresponding base station 160A-160G, and wherein one or more access terminals (AT) 106A-106G may communicate in a respective cell with a respective base station to connect to each other, to a wireline telephone, or to a packet-based network such as the Internet. Communication systems may use a single carrier frequency or multiple carrier frequencies. In wireless communication systems, a channel consists of a forward link (FL) for transmissions from a respective base station 160 to a respective AT 106 and a reverse link (RL) for transmissions from a respective AT 106 to a respective base station 160. Each link may incorporate a different number of carrier frequencies.

AT 106 is also known as a remote station, a mobile station, user equipment or a subscriber station. Furthermore, AT 106 may be any data device that communicates through a wireless channel or through a wired channel, for example using fiber optic or coaxial cables. An AT 106 may further be any of a number of types of devices including but not limited to PC card, compact flash, external or internal modem, or wireless or wireline phone. Also, AT 106 may be mobile or stationary.

It is noted that the data rate control (DRC), data source control (DSC), acknowledge (ACK), reverse rate indicator (RRI), Pilot and Data (or Traffic) channels are channels transmitted on the reverse link. The DRC, DSC, ACK, RRI and Pilot are overhead channels. When there is only one DSC on the reverse link carrier, information is provided to a base station 160 for one forward link carrier, the primary forward link (FL) carrier. On the other hand, there may be a plurality of DRC and ACK channels, which provide information to a base station 160 for a primary and secondary FL carriers. Also, there will be one RRI and one Pilot channel on each reverse link carrier which provide information to the AT. It is also noted that the FL carriers carry Traffic (or Data) channels and overhead channels such as the ACK channel, the reverse power channel (RPC) and the reverse activity bit (RAB) channel. These overhead channels provide information to the AT.

The system 100 may be a code division multiple access (CDMA) system having a High Data Rate, HDR, overlay system, such as specified in the HDR standard. In HDR Systems, the HDR base stations 160 may also be described as access points (AP) or modem pool transceivers (MPTs), and HDR access terminals 106 may be described as subscriber stations. Also, each base station 160 may include multiple sectors, wherein each sector provides at least one channel. A channel is defined as the set of communication links for transmissions between the base station 160 and the AT's 106 within a given frequency assignment. An access terminal 106 that has established an active traffic channel connection with one or more modem pool transceivers 160 is called an active access terminal 106, and is said to be in a traffic state. An access terminal 106 that is in the process of establishing an active traffic channel connection with one or more modem pool transceivers 130 is said to be in a connection setup state.

Figure 2:
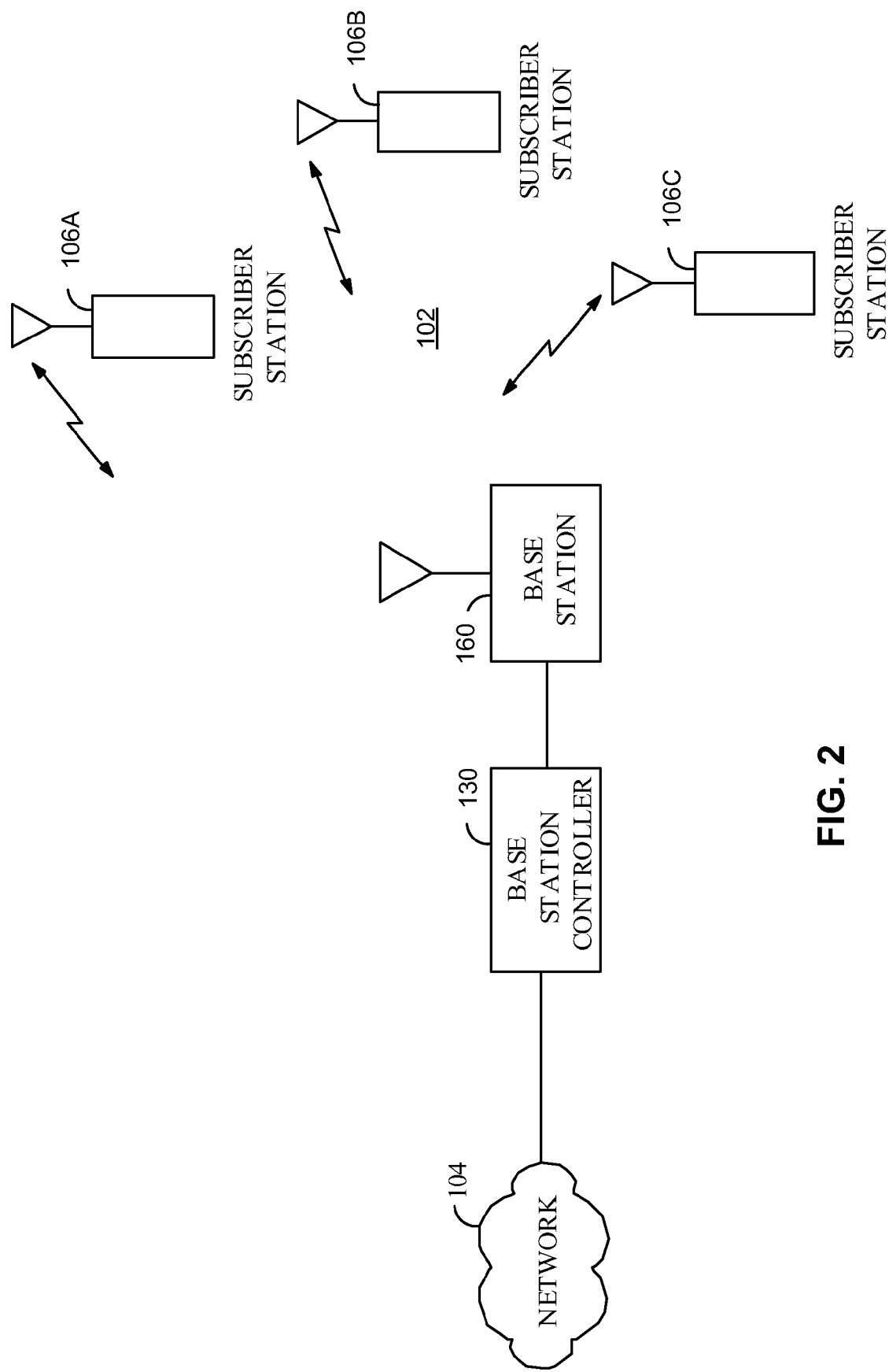
FIG. 2 is a schematic diagram of an aspect of an exemplary CDMA communications system.

Referring to FIG. 2, an exemplary CDMA communications system includes base station controller 130 to provide an interface between a network 104 and all base stations 160 dispersed throughout a geographic region. For ease of explanation, only one base station 160 is shown. The geographic region is generally subdivided into smaller regions known as cells 102. Each base station 160 is configured to serve all subscriber stations 106 in its respective cell. In some high traffic applications, the cell 102 may be divided into sectors with a base station 160 serving each sector. In the described exemplary embodiment, three subscriber stations 106A-C are shown in communication with the base station 160. Each subscriber station 106A-C may access the network 104, or communicate with other subscriber stations 106, through one or base stations 160 under control of the base station controller 130.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

Figure 3:
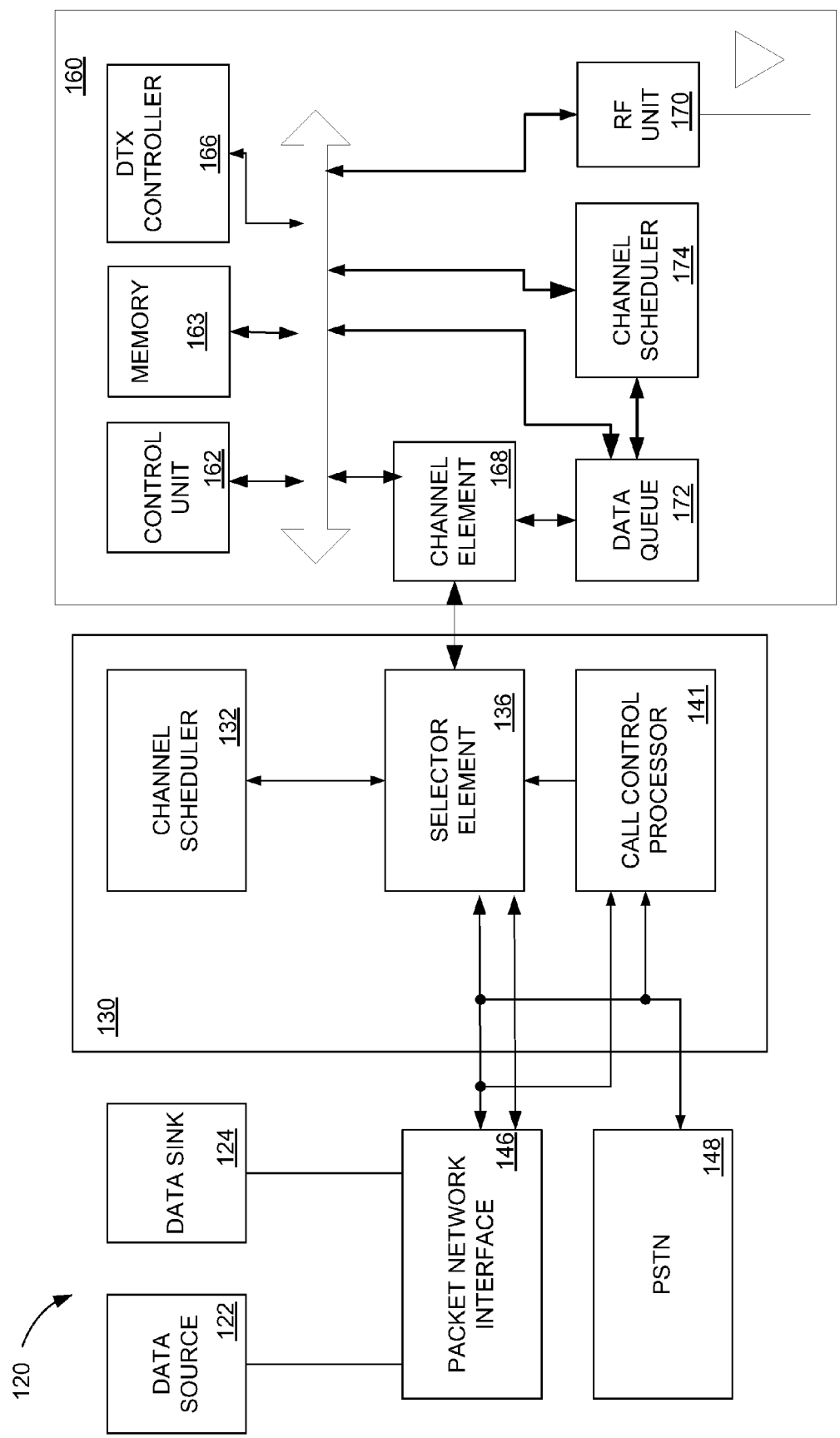
FIG. 3 is a schematic diagram of an aspect of an exemplary communication system supporting the HDR transmissions and adapted for scheduling transmissions.

Referring to FIG. 3, one example of a communication system 120 supporting the HDR transmissions and adapted for scheduling transmissions to multiple users includes base station 160 interfacing with base station controller 130, which interfaces with a packet network interface 146 and a Public Switched Telephone Network (PSTN) 148. Base station controller 130 includes a channel scheduler 132 for implementing a scheduling algorithm for transmissions in system 120. The channel scheduler 132 determines the length of a service interval during which data is to be transmitted to any particular remote station based upon the remote station's associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data, Ri, determines the service interval length, Li, associated with a particular data queue.

In addition, the channel scheduler 132 selects the particular data queue for transmission. The associated quantity of data to be transmitted is then retrieved from a data queue 172 and provided to the channel element 168 for transmission to the remote station associated with the data queue 172. As discussed below, the channel scheduler 132 selects the queue for providing the data, which is transmitted in a following service interval using information including the weight associated with each of the queues. The weight associated with the transmitted queue is then updated.

As noted, base station controller 130 interfaces with packet network interface 146, Public Switched Telephone Network, Public Switched Telephone Network (PSTN), 148, and all base stations in the communication system (for simplicity, only one base station 160 is illustrated). Base station controller 130 coordinates the communication between remote stations in the communication system and other users connected to packet network interface 146 and PSTN 148. PSTN 148 interfaces with users through a standard telephone network.

Base station controller 130 contains many selector elements 136 (for simplicity, only one is illustrated). Each selector element 136 is assigned to control communication between one or more base stations 160 and one remote station (not shown). If selector element 136 has not been assigned to a given remote station, call control processor 141 is informed of the need to page the remote station. Call control processor 141 then directs base station 160 to page the remote station.

Data source 122 contains a quantity of data that is to be transmitted to a given remote station. Data source 122 provides the data to packet network interface 146. Packet network interface 146 receives the data and routes the data to the selector element 136. Selector element 136 then transmits the data to each base station 160 in communication with the target remote station. In the exemplary embodiment, each base station 160 maintains a data queue 172, which stores the data to be transmitted to the remote station.

The data is transmitted under the control of control unit 162 and DTX controller 166 in data packets from data queue 172 to channel element 168. In one aspect, on the forward link, a "data packet" refers to a quantity of data which is a maximum of 1024 bits and a quantity of data to be transmitted to a destination remote station within a predetermined "time slot" (such as ≈1.667 msec). For each data packet, channel element 168 inserts the control fields. In the exemplary embodiment, channel element 168 performs a Cyclic Redundancy Check (CRC), encoding of the data packet and control fields, and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The forward link signal is transmitted over the air through an antenna to the forward link (FL).

At the remote station 106 (see FIGS. 1 and 2), the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 160, specifically the de-interleaving, decoding, and CRC check functions. The decoded data is provided to a data sink 124.

The DRC signal transmitted by each subscriber station 106 travels through a reverse link (RL) channel and is received at base station 160 through a receive antenna coupled to RF unit 170. In the exemplary embodiment, the DRC information is demodulated in channel element 168 and provided to a channel scheduler 132 located in the base station controller 130 or to a channel scheduler 174 located in the base station 160. In a first exemplary embodiment, the channel scheduler 174 is located in the base station 160. In an alternate embodiment, the channel scheduler 132 is located in the base station controller 130, and connects to all selector elements 136 within the base station controller 130.

The steps executed in the present method and apparatus may, in one aspect, be stored in the base station 160 in memory 163 as instructions which may be executed by the control unit 162, which may include one or more processors.

Figure 4:
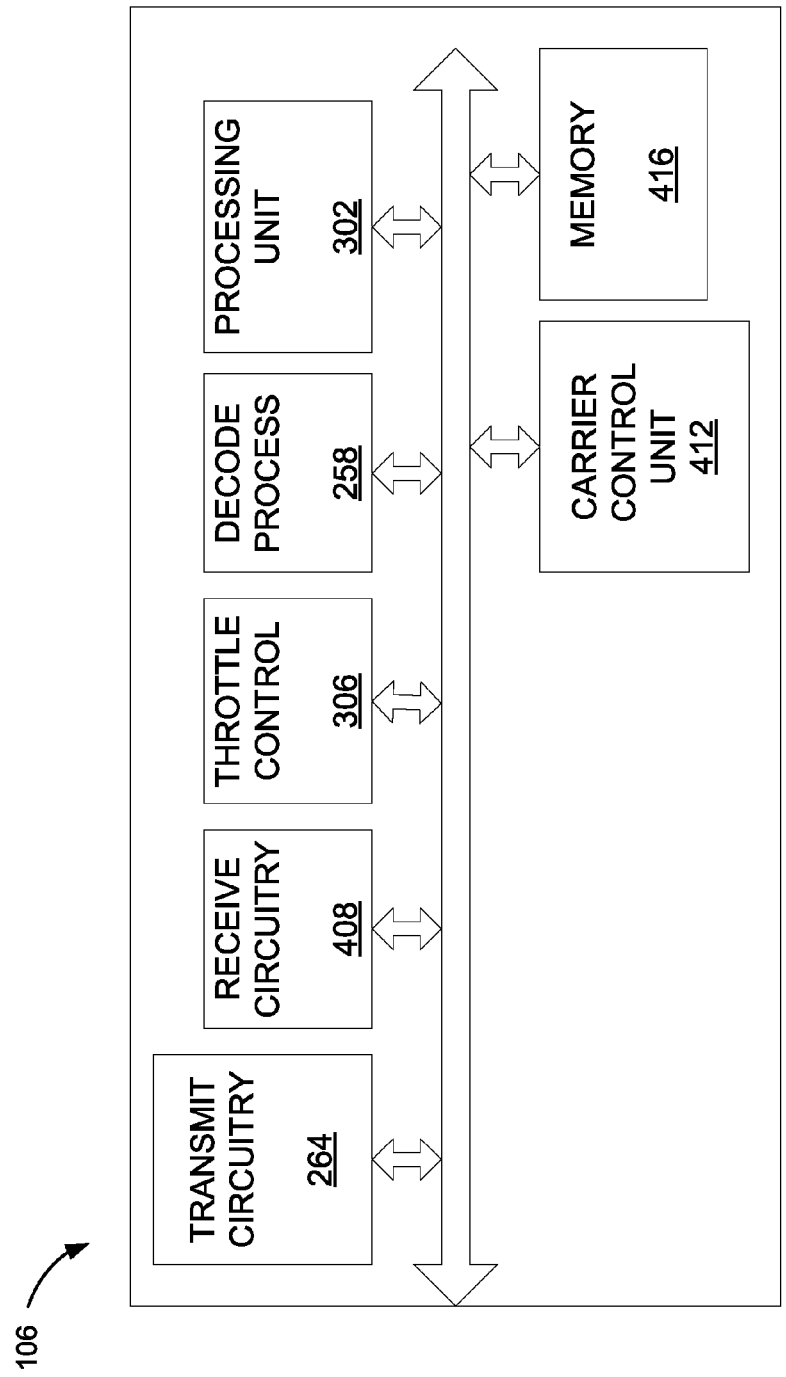
FIG. 4 is a schematic diagram of an aspect of an exemplary access terminal.

Referring to FIG. 4, in one aspect, a user equipment (UE) (in a 3GPP context) or an access terminal (AT) (in a 3GPP2 context) 106 includes transmit circuitry 264, receive circuitry 408, throttle control 306, decode process unit 258, processing unit 302, carrier control unit 412 and memory 416. The throttle control unit 306 implements at least one set of throttle rules, such as those illustrated above. Throttle rules provide means and methods for controlling transmit power on the RL.

The steps executed in the present method and apparatus may, in one aspect, be stored in the mobile unit 106 in memory 416 as instructions which may be executed by the processor unit 302.

II. Architecture Reference Model

In the following discussion, the aspects will be described mainly in the context of the 3GPP architecture reference model. It is understood that with the disclosed information, however, one skilled in the art could easily adapt for use and implement these aspects in a 3GPP2 network architecture or in other network architectures.

Figure 5:
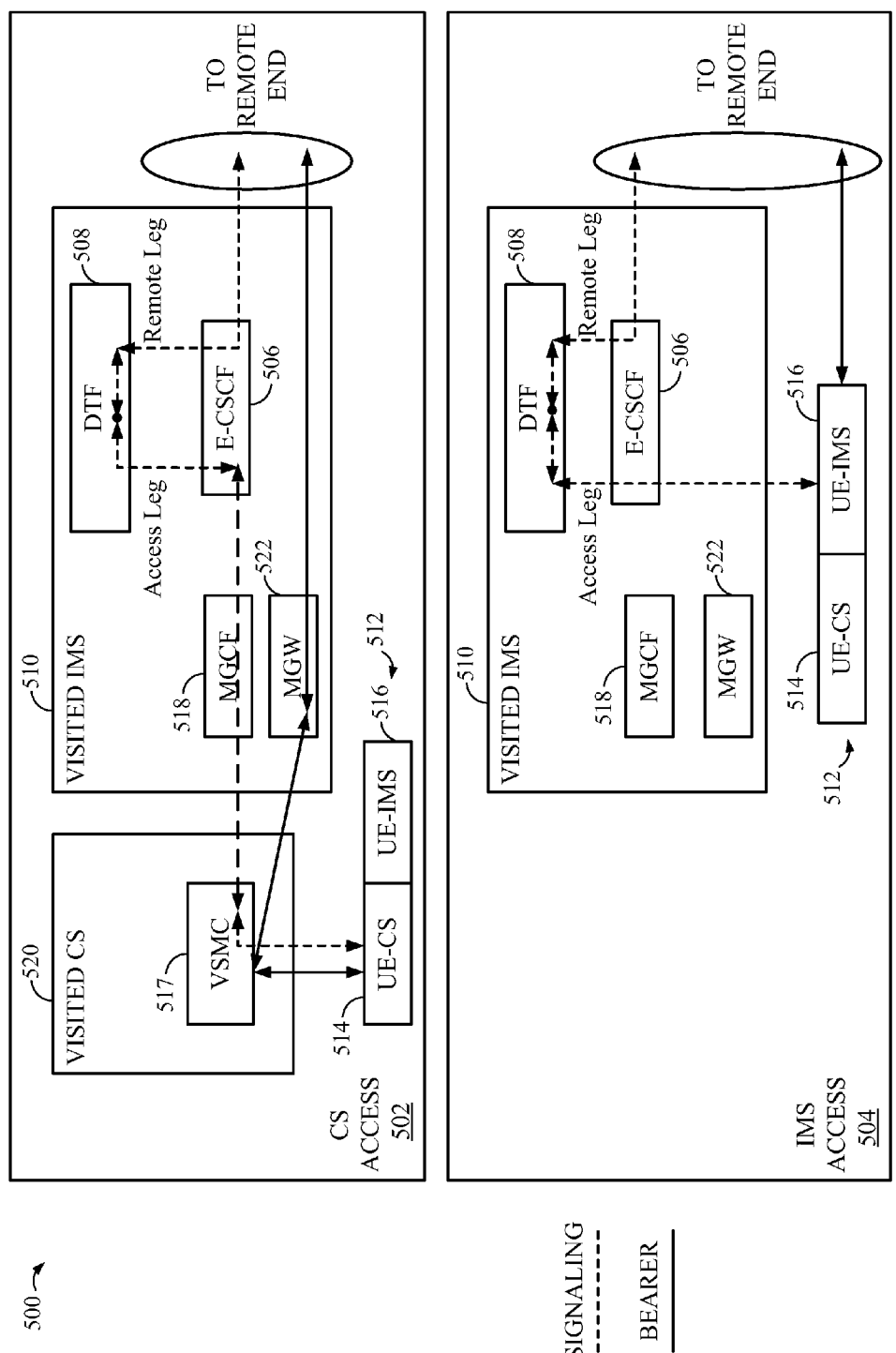
FIG. 5 is a schematic diagram of an aspect of a reference model architecture for VCC operation.

Referring to FIG. 5, in one aspect, a reference model system architecture 500 for VCC support for an IMS emergency call is illustrated for a 3GPP implementation, including both a circuit-switched (CS) access domain 502 and an Internet Protocol Multimedia Subsystem (IMS) access domain 504. In architecture 500, an Emergency Call Session Control Function (E-CSCF) 506 and a Domain Transfer Function (DTF) 508 reside in a visited IMS network 510. Note that Domain Transfer Function (DTF) 508 may also be referred to as a VCC Application, a VCC Call Continuity Control Function (CCCF), a VCC Application Server (VCC AS) or a Service Centralization and Continuity Application Server (SCC AS). The visited network P-CSCF (which is also part of the model) is not shown in this figure. When the user equipment (UE) 512 is not roaming, the home IMS network becomes the visited IMS network 510.

In general, domain transfer procedures for an emergency call enable voice call continuity (VCC) between circuit-switched (CS) domain 502 and Internet Protocol (IP) based domain 504 while maintaining an active voice session when using domain-specific VCC capable uplink (UL) 514 and 516. All Domain Transfer procedures associated with a VCC subscriber call including initial and subsequent transfers are executed and controlled in a visited IMS network 510 by the Domain Transfer Function (DTF) 508.

As shown in FIG. 5, static anchoring techniques are employed to establish a 3rd party call control (3 pcc) function for VCC subscriber voice calls using a VCC capable UE 514 and 516 at the DTF 508 upon session establishment. The DTF 508 is invoked as part of originating or terminating Initial Filter Criteria (iFC) execution at the visited E-CSCF 506. The DTF 508 inserts itself in the signaling path of the VCC subscriber's voice calls made using VCC UE 514 and 516 by employing a Routing 3 pcc function.

For an originating voice session, the DTF 508 terminates an Access Leg from the user and establishes a Remote Leg toward the remote end, such as a Public Safety Answering Point (PSAP). For example, in the CS access domain 502, the VCC and CS capable UE 514 has a CS signaling access path to a Visited Mobile Switching Center (VMSC) 517 in a visited CS network 520, through a Media Gateway Control Function (MGCF) 522 to the E-CSCF 506, which is then intercepted by the DTF 508. It should be noted that the bearer path goes from the VMSC 517 through a Media Gateway (MGW) 522 to the remote end. Further, for example, in the IMS domain 504, the VCC and IMS or packet-switched (PS) capable UE 516 has an IMS or PS signaling access path to the E-CSCF 506, which is then intercepted by the DTF 508. It should be noted that the bearer path goes from the UE IMS 516 to the remote end.

In some examples, it is assumed that for CS access 502, a Media Gateway Control Function (MGCF) 518 may adequately populate the information needed in a SIP INVITE from information received in an ISDN User Part (ISUP) Identity and Access Management (IAM) message in the case of emergency call origination from the CS domain 502 or packet-switched (PS) to CS domain transfer using a new emergency call origination from the CS domain 502.

The CS Access diagram 502 above does not show all the components in the session path between the MGCF 518 and the E-CSCF 506—e.g. the Interrogating Call Session Control Function (I-CSCF) which handles the routing of the Packet Switching Interface (PSI) in IMS.

Figure 6:
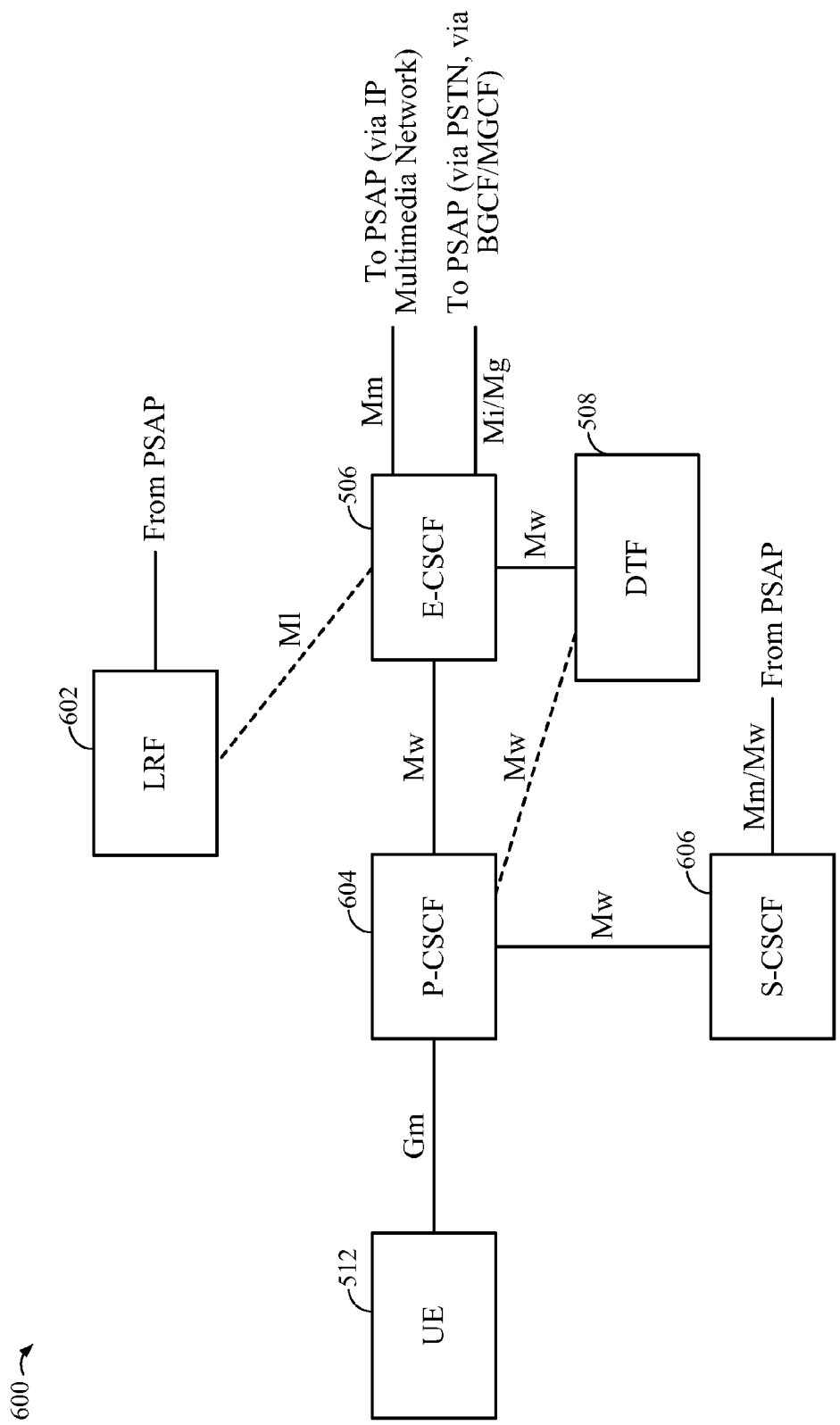
FIG. 6 is a schematic diagram of a reference model system architecture 600 complimentary to the architecture 500 of FIG. 5, but from the perspective of the model defined in 3GPP TS 23.167 to support IMS (VoIP) Emergency calls.

Referring to FIG. 6, a reference model system architecture 600 is complimentary to the architecture 500 of FIG. 5, but from the perspective of the model defined in 3GPP TS 23.167 to support IMS (VoIP) Emergency calls. In this figure, the VCC DTF 504 is added with an interface to the E-CSCF 506. The emergency call will be anchored in the VCC DTF 504. In addition, location support will be anchored in a Location Retrieval Function (LRF) 602 in the visited network such that the PSAP can continue to obtain updated location estimates from the same LRF following any change of domain. This LRF 602 is referred to as the anchor LRF. Note that architecture 600 further explicitly includes a Proxy CSCF (P-CSCF) 604 and a Serving CSCF (S-CSCF) 606.

III. Negotiation of VCC Support:

For normal VCC defined in TS 23.206, the network (e.g. S-CSCF and VMSC) is aware of the user's VCC capability from the user's subscription based information stored in the HSS/HLR (i.e. provisioned iFCs and CAMEL subscription). The UE uses a statically provisioned VDN (E.164 Voice Domain Transfer Number) and VDI (Voice Domain Transfer SIP URI) for domain transfer.

For VCC for IMS Emergency calls, the visited network needs to be aware of the VCC capability of the user. For example, without any negotiation of VCC support, it may be difficult to support VCC because when the UE changes domain, it will have no idea in a roaming situation whether the old and new domains can collaborate to support VCC and hence it won't know whether the existing call can be continued or not. In the following discussion, it is assumed that VCC support for IMS emergency calls is provided in the visited network.

III. A. Methods to Convey that the UE is VCC Capable

In some examples, apparatus and methods to convey that the UE is VCC capable include any of the following alternatives:

(a) If the visited network is the home network for the UE, it may discover UE VCC capability from subscription information for the user.

(b) The visited network (e.g. E-CSCF) may assume that all UEs are VCC capable (whether or not any particular UE actually is).
(c) The visited network (e.g. E-CSCF and GMLC) may be configured with either the identities of particular networks all of whose UEs can be assumed to support VCC or the identities of particular UEs (e.g. belonging to roaming partners) who can be assumed to support VCC.
(d) The UE may include information in call establishment and/or registration related messages—e.g. in a SIP INVITE or DTAP SETUP or DTAP EMERGENCY SETUP message. In the case of an EMERGENCY SETUP message, some unused bits in the optional Service Category IE that may be used for this—e.g. 2 previously unused bits may be assigned to distinguish call origination with or without VCC support from VCC domain transfer. Another alternative would be to send a normal SETUP message rather than an EMERGENCY SETUP message in which different called party numbers were used to designate an emergency call, support of VCC and distinguish call origination from domain transfer. Such numbers may be defined globally, and/or the UE can be configured with numbers specific to certain networks, or, alternatively, a called party number specific to domain transfer might be returned to a UE as a modified VDN as described below.

Alternative (a) is applicable to an emergency call originated in the PS (packet switched) domain and may use the same mechanism for VCC capability discovery that is used for normal VCC support (for non-emergency calls) as described in 3GPP TS 23.206 if the UE is not roaming (i.e., is served by its home network).

With alternative (b), the visited network assumes that the UE is VCC capable and assigns VCC resources when the emergency call is originated. VCC resources would then be wasted for UEs that were not VCC capable. For emergency calls originated in the PS domain the wastage may be small, because the number of such calls will generally be a very small proportion of all IMS calls in the PS domain. In addition, if alternative (a) is combined with alternative (b) such that the visited network assumes UE VCC capability only if it is not the home network, the wastage is further reduced. However, for CS originated emergency calls, there will probably be a higher level of wastage because most CS emergency calls, at least initially, will come from legacy UEs not capable of supporting VCC.

With alternative (c), a particular operator may agree to provide VCC support to the UEs belonging to certain other operators as part of normal roaming agreements.

With alternative (d), the visited network can be sure of UE support or non-support at the expense of some impacts to the UE and possibly to the IP-CAN. Alternative (d) also allows the possibility of distinguishing a SIP INVITE or DTAP EMERGENCY SETUP message that is sent to originate an emergency call from one that is sent to perform a domain transfer.

Alternatives (a), (b) and (c) avoid adding new impacts to the UE, which is desirable to enable a common VCC solution, from the perspective of the UE, for both emergency and non-emergency calls.

III. B. Methods to Convey that the Visited Network is VCC Capable

In some examples, to convey to the UE that the visited network is VCC capable and transfer the VDN and VDI, the following alternatives are possible.
(e) The UE discovers visited network VCC capability (and VDN and VDI) from system broadcast messages.
(f) The UE discovers the visited network VCC capability and the VDN and VDI where needed using DHCP or using HTTP or HTTPS from a server in the visited network whose role is to provide information related to emergency calls (e.g. including also local emergency numbers).
(g) The home network downloads information to the UE, or to the UICC, concerning networks that are known to support VCC for emergency calls. For example, the home network could provide the UE with the MCC and MNC of all known networks that support VCC for emergency calls. Additional information, such as the VDNs and VDIs use by such networks, could also be provided.
(h) Use of SIP messages and parameters to convey support of VCC and any VDN or VDI (e.g. UE Subscribe/Notify after call set up or use of the SIP 200 OK message).

Alternative (e) would be suitable for UMTS, GPRS and GSM networks and may be suitable for WLANs.

Alternative (f), which is applicable to IMS but not CS originated calls, could be combined with the provision of local emergency numbers to a UE from some server in the visited network. The address of this server could be obtained by the UE using either DHCP or a DNS query on some known FQDN containing the visited network's known domain name and some fixed user name—e.g. "emergency-support@<visited network domain>"). As a variant, VCC capability (and VDN and VDI addresses if needed) could be signaled directly if and when the UE uses DHCP to discover the P-CSCF and DNS server addresses.

Alternative (g) can be valid for all UEs and may include protocol enhancements between the home network and the UE.

Alternative (h) is available when an emergency call is originated in IMS, and may be available when the call is originated in CS.

IV. Domain Transfer

Figure 7:
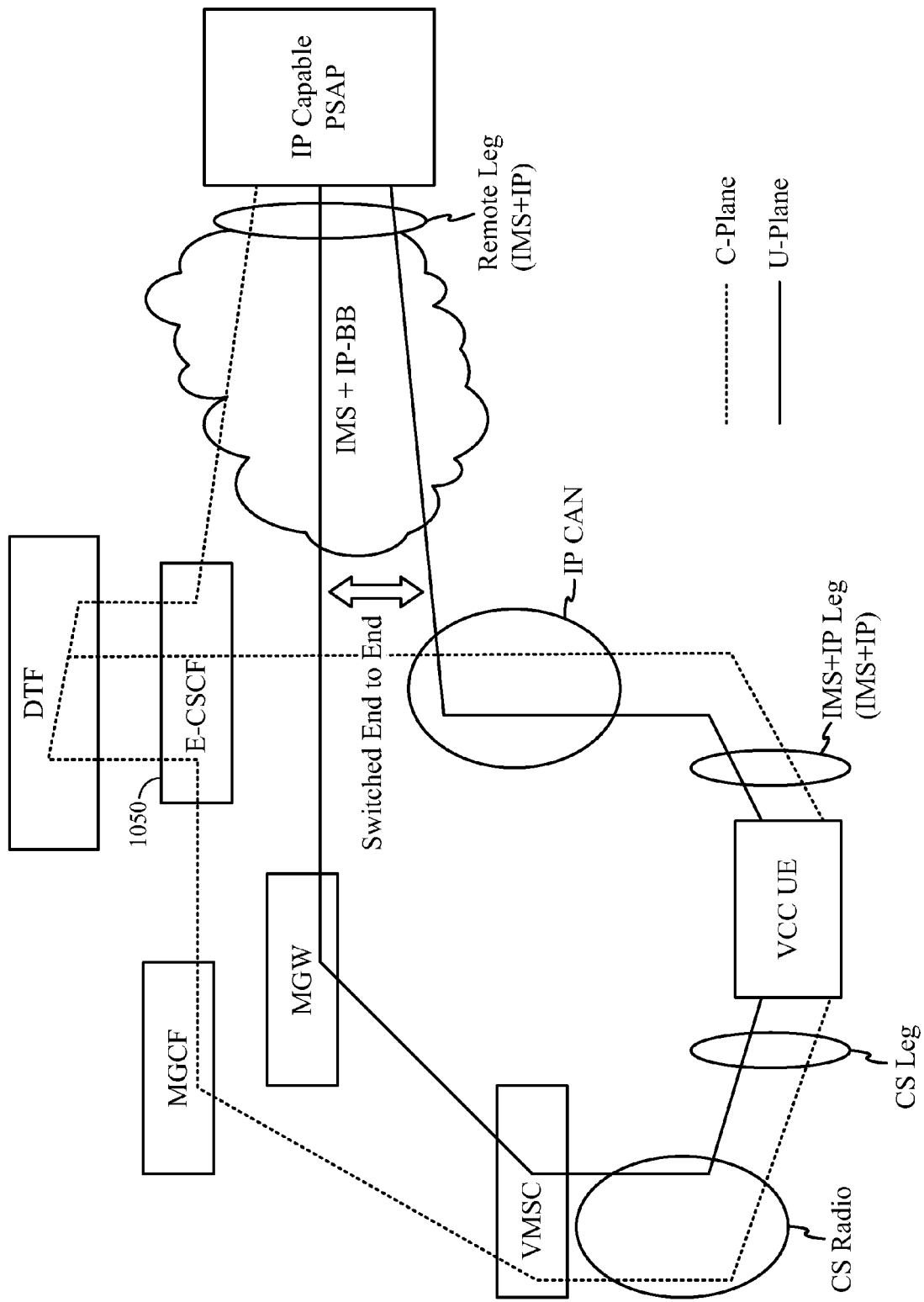
FIG. 7 is a schematic diagram of an aspect of a model of switching a user plane (U-plane) path between a VCC UE and an IP Capable PSAP.
Figure 8:
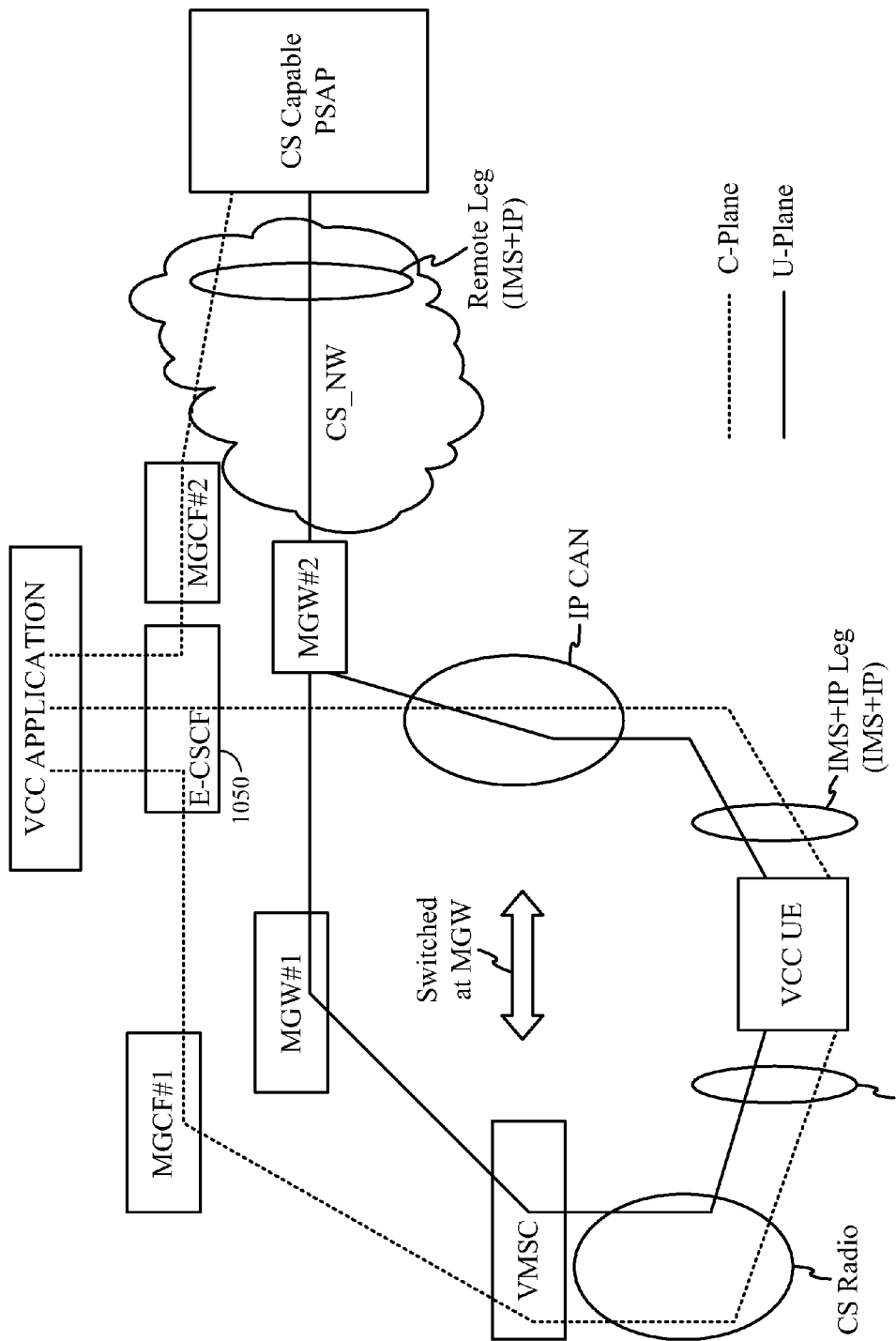
FIG. 8 is a schematic diagram of an aspect of a model of switching a user plane (U-plane) path between a VCC UE and an CS Capable PSAP.

Domain transfer can occur in a very similar manner to that for normal VCC as defined in TS 23.206. FIGS. 7 and 8 are based on FIGS. 6.4.1.3-1 and 6.4.1.3-2 in TS 23.206, and FIGS. 7 and 8 illustrate switching of the user plane for IMS emergency calls to an IP capable PSAP and a CS (PSTN) capable PSAP, respectively. Note that some elements are missing or may be missing from both figures—e.g. I-CSCF and possibly RUA or CSAF between the I-CSCF and E-CSCF 1050 in the case of CS domain access.

V. Modified VDN and VDI

Figure 12:
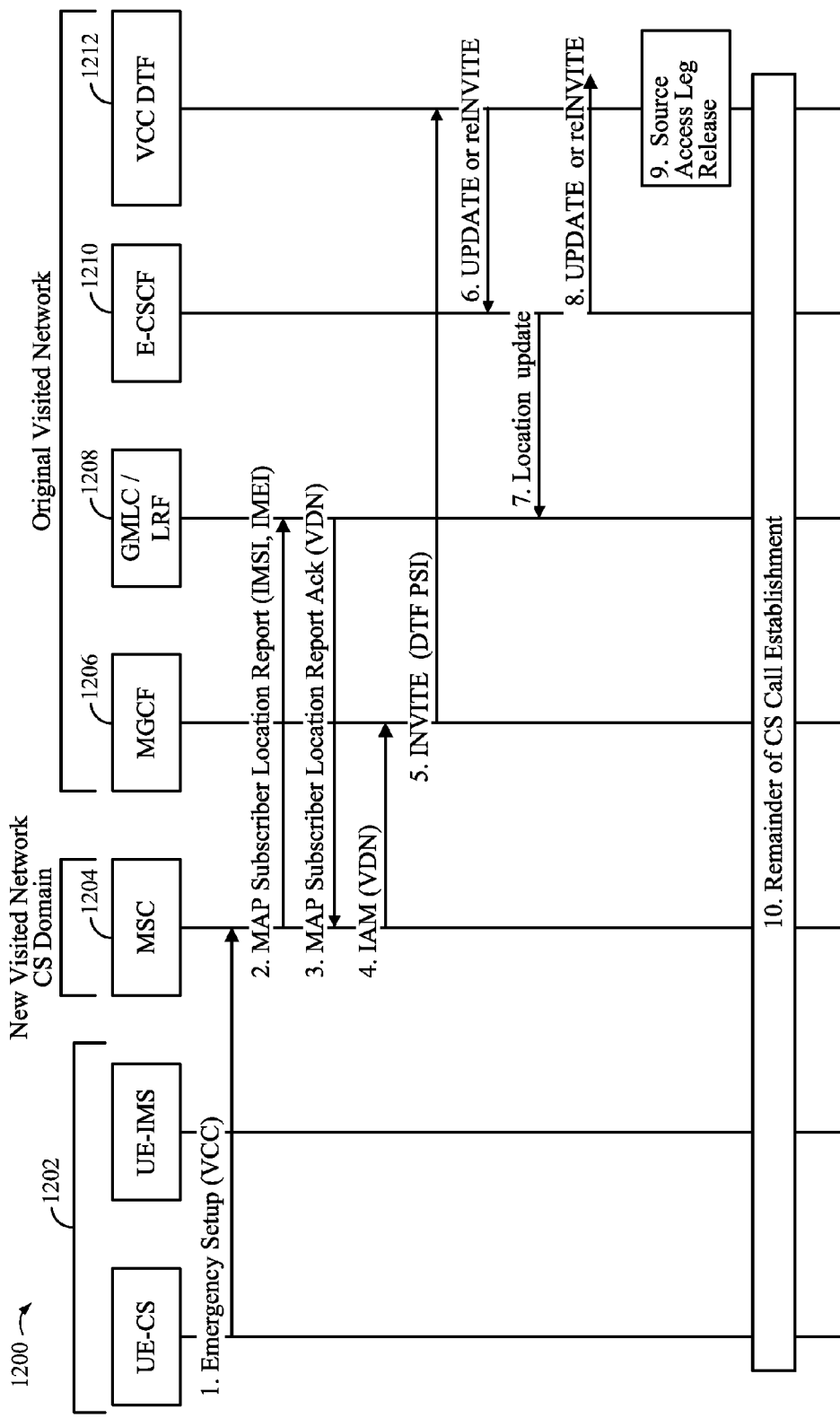
FIG. 12 is a schematic diagram of an aspect of a Procedure B for IMS to CS domain transfer.

The described aspects further include apparatus and methods of modifying the VDN and the VDI to achieve VCC. Specifically, the VDN and VDI may be modified to enable domain transfer in the context of emergency call recognition and treatment. In the case of the VDN, a VPLMN may assign a modified VDN (and provide it to the UE via one of the mechanisms described above with respect to negotiation of VCC support) that would be recognized by an MSC as an emergency number thereby triggering a MAP query with a GMLC as described below with respect to Domain Transfer from IMS to CS, Procedure B (FIG. 12). A different GMLC E.164 address for SCCP signaling transport may be configured in the MSC in association with this modified VDN to implicitly inform the GMLC (via the SCCP protocol layer) that the MAP SLR was associated with an existing emergency call (as opposed to a new emergency call) for which a domain transfer was requested. A single physical GMLC could be associated with several SCCP E.164 addresses to ensure that a MAP SLR for a new originating emergency call and a MAP SLR for an existing emergency call for which domain transfer was requested both reached the same GMLC. More details of this aspect are provided in the detailed procedure description below with respect to Domain Transfer from IMS to CS, Procedure B (FIG. 12).

In the case of a modified VDI, a URI (e.g. SIP URI) may be assigned by the VPLMN or defined globally that indicates a request for domain transfer for an existing emergency call. This may be used for the CS to IMS domain transfer procedure described below. This aspect further may include A PLMN assigned VDI provided to the UE (e.g. using any of the methods described above with respect to Negotiation of VCC Support).

The significance of using a modified VDN and VDI (and a reason for retaining the existing VDN and VDI terms) is that from the UE perspective, domain transfer may proceed (mostly or entirely) as for normal VCC defined in TS 23.206.

VI. Procedures

In the following procedures, the VDN and VDI are assumed to be assigned by the visited IMS network (e.g. may be static in the visited network) and are thus not configured in the UE as for normal VCC defined in TS 23.206.

VI. A. IMS Emergency Call Origination

Emergency call origination may occur as defined in TS 23.167 but with some changes to add negotiated usage of VCC. In particular, in order to preserve continuity of location support as well as continuity of the voice call following any domain transfer, the E-CSCF in the visited network would need to send the SIP INVITE (for the IMS emergency call) to the VCC DTF before invoking the LRF to obtain or verify location and select the destination PSAP. The VCC DTF would then anchor the incoming call leg and originate a new outgoing call leg through the E-CSCF towards the PSAP. On receiving the SIP INVITE from the VCC DTF, the E-CSCF would perform normal location and routing as defined in TS 23.167 and transfer the call to the PSAP either via IP or through an MGCF and the PSTN. This will result in the E-CSCF being part of the outgoing call leg from the DTF which means the LRF can remain associated with the outgoing call leg following any domain transfer and will thus be able to provide continuing support of location provided it is updated with new information regarding changes to the access network following any change of domain.

Figure 9:
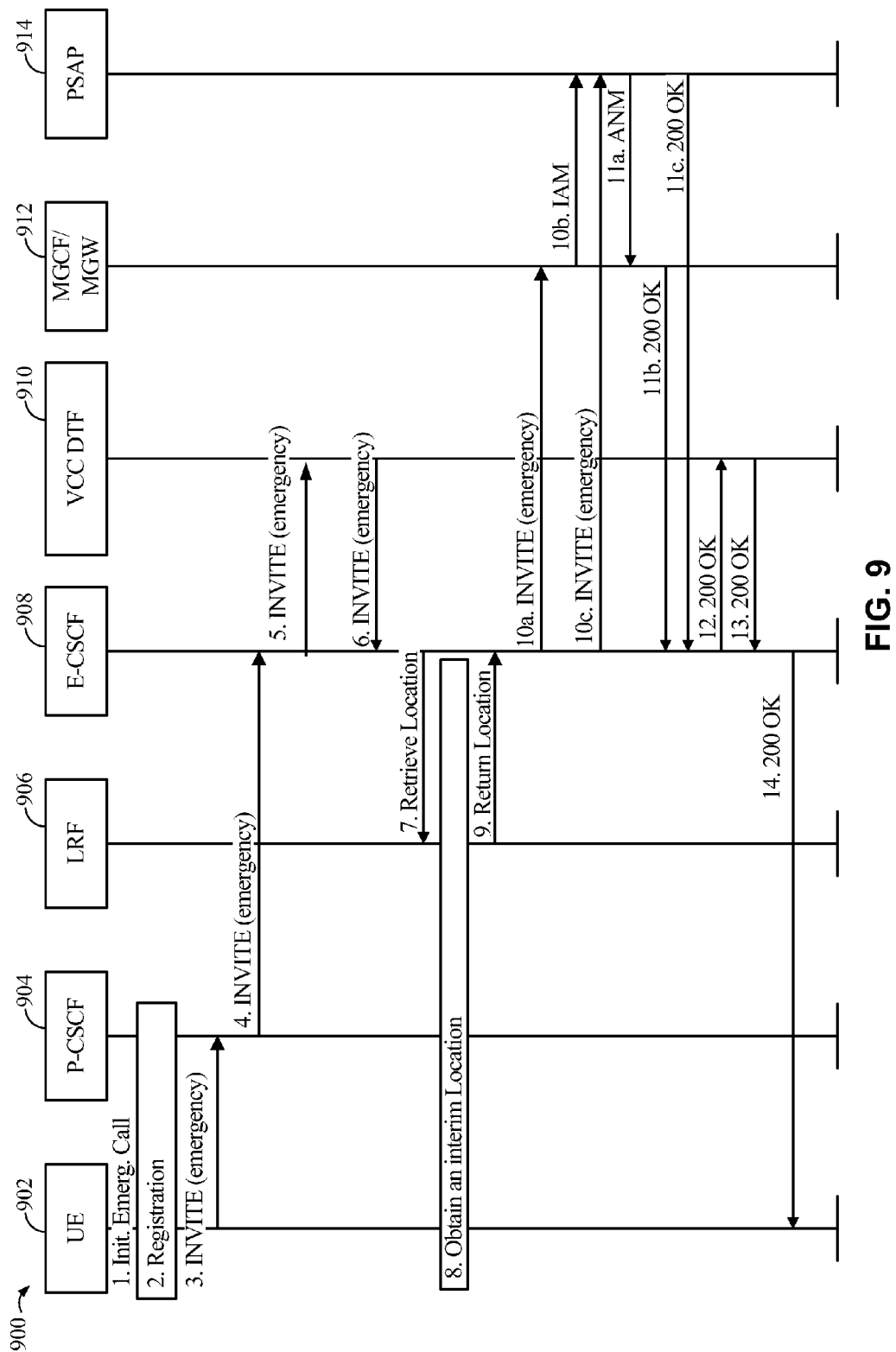
FIG. 9 is a schematic diagram of an aspect of a message flow in an IMS emergency call origination with VCC support.

Referring to FIG. 9, one aspect of a call origination procedure 900 includes the following steps and actions.

1. The user initiates an emergency call.
2. If the UE 902 is roaming or if the UE is not roaming and not yet IMS registered, the UE performs an emergency registration procedure with the visited network P-CSCF 904 and home network S-CSCF (not shown) as described in TS 23.167 if it contains the necessary credentials.
3. The UE 902 sends an INVITE with an emergency indication to the visited network P-CSCF 904. The INVITE may contain any location objects that the UE has. The INVITE may include identification information, e.g. address or number, for the UE—e.g. public user SIP URI and Telephone URI. The INVITE may indicate that the UE supports VCC and may indicate that this is a call origination as opposed to a request for domain transfer.
4. The P-CSCF 904 forwards the SIP INVITE to an E-CSCF 908.
5. The E-CSCF 908 based on assumption or knowledge of VCC support by the UE 902, or based on an indication of VCC support in the INVITE, forwards the SIP INVITE to a VCC DTF 910.
6. The VCC DTF 910 anchors the incoming call leg and originates an outgoing leg by sending the INVITE to (or back to) the E-CSCF 908. The INVITE still carries an emergency indication.
7. The E-CSCF 908 performs normal treatment for emergency call setup as defined in 3GPP TS 23.167. If the location object provided in the INVITE is insufficient to determine the correct PSAP or if the IMS core requires the assistance of an RDF, of if the IMS core is required to verify the location object, a retrieve location request is sent to the LRF 906 performing the location retrieval functionality. The retrieve location request shall include information identifying the UE 902 (e.g. public user Tel URI and SIP URI), the IP Connectivity Access Network (IP-CAN) and may include means to access the UE (e.g. UE IP address). The retrieve location request may also include any location objects provided in the INVITE in step 3. The retrieve location request may further include an indication of VCC support by the UE and identification information for the VCC DTF 910—e.g. the VDN and VDI assigned by the VCC DTF 910—if this is not already known (e.g. provisioned in) the LRF 906. This information enables continuity of location support by the LRF 906 as described in other sections in association with domain transfer.
8. The LRF 906 may obtain an interim location estimate as described in TS 23.167. The LRF 906 may invoke an RDF to convert the interim location or any location object received in step 6 into the address of a PSAP. The LRF 906 may record the information received in step 6.
9. The location information and/or the PSAP address obtained in step 7 are returned to the E-CSCF 908. The LRF 906 may also return correlation information (e.g. ESQK) identifying itself and any record stored in step 7. For the remainder of the call, the LRF 906 serves as the anchor LRF.
10. The E-CSCF 908 uses the PSAP address provided in step 8 or selects an emergency centre or PSAP based on location information provided in step 8 and sends the request including the location information and any correlation information to the emergency centre or PSAP 914. In step 10a, the INVITE is sent to an MGCF/MGW 912, and in step 10b, the IAM is continued towards the emergency centre or PSAP 914. Or, in step 10c, the INVITE is sent directly to the emergency centre or PSAP 914.
11. Intermediate signaling for call establishment may occur (e.g. return of an ACM from a PSTN capable PSAP, which is not shown). When the PSAP answers the call, the following steps occur: in step 11a, the PSAP 914 returns an ANM to the MGCF/MGW 912; in step 11b, the MGCF/MGW 912 returns a 200 OK to the E-CSCF 908; or, in step 11c, the PSAP 914 returns a 200 OK directly to the E-CSCF 908.
12. The E-CSCF 908 returns the 200 OK to the VCC DTF 910 (on the outgoing call leg started in step 5).
13. The VCC DTF 910 returns a 200 OK to the E-CSCF 908. The VCC DTF (or the E-CSCF) may insert a VDN and/or VDI into the 200 OK to support the domain transfer procedures A and C described below. Alternatively, the VCC DTF (or the E-CSCF) may insert a modified VDN and/or modified VDI (as described above in the Modified VDN and VDI section) into the SIP INVITE to support the domain transfer procedures B and D described below.
14. The E-CSCF 908 returns the 200 OK to the UE 902 via the P-CSCF 904.

VI. B. CS Emergency Call Origination

Figure 10:
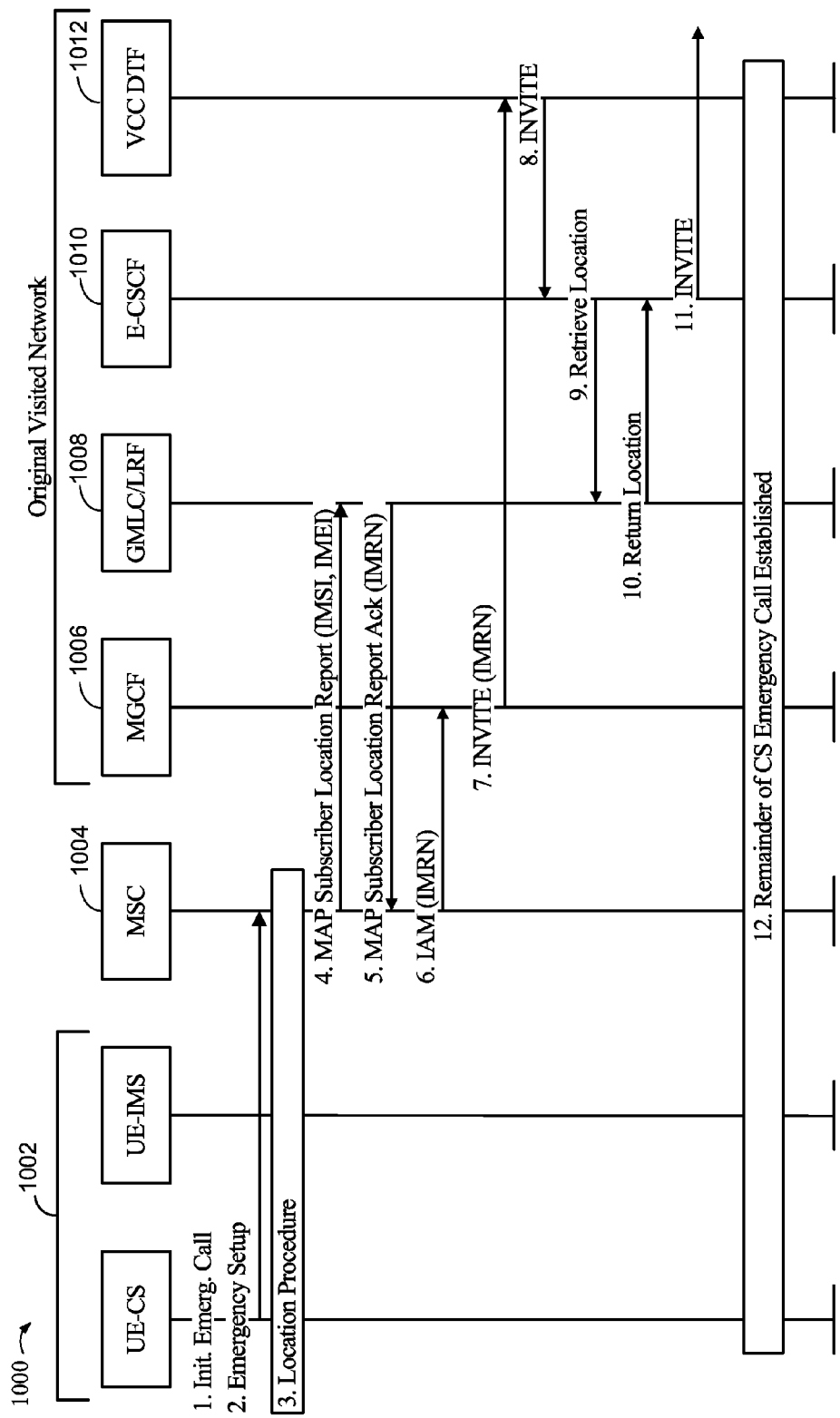
FIG. 10 is a schematic diagram of an aspect of a message flow in a CS emergency call origination with VCC support.

Referring to FIG. 10, one aspect of a message flow 1000 for VCC support for an emergency call originated in the CS domain includes the following steps and actions.

1. The user initiates an emergency call.
2. The UE 1002 originates an emergency voice call in the CS domain by sending an Emergency Setup message to the VMSC 1006 (as defined in 3GPP TS 24.008, hereby incorporated by reference). The Emergency Setup may indicate that the UE supports VCC and may further indicate that this is a call origination as opposed to a request for domain transfer.
3. The VMSC 1006 may initiate a procedure in the RAN to obtain an interim location estimate for the UE 1002 as defined and allowed in 3GPP TS 23.271.
4. Based on normal handling for all CS emergency calls (e.g. as described in TS 23.271) or based on assumed VCC support according to the UE's home network operator or based on subscription information obtained from the UE's home HLR/HSS or based on an explicit indication of VCC support in the Emergency Setup message, the VMSC 1006 sends a MAP Subscriber Location Report (SLR) to a GMLC/LRF 1008 associated with the emergency service provider (PSAP) to which the call would normally be sent (e.g. based on the serving cell ID and dialed emergency number). The MAP Subscriber Location Report carries the IMSI, MSIDN, IMEI, VMSC address and serving cell identity or SAI for the UE. It also includes any interim location estimate obtained in step 3. In regions where the VMSC 1006 and not the GMLC/LRF 1008 normally determines the PSAP (e.g. the EU), the message may carry the address of the intended destination PSAP. The message may also carry any indication of VCC support and/or whether for a call origination or domain transfer that was received in the Emergency Setup. This indication could be an explicit parameter or parameter value in the MAP SLR or it could be associated with a distinct SCCP E.164 address (associated with the GMLC) to which the MAP SLR is routed.
5. The GMLC/LRF 1008 assumes the UE 1002 supports VCC (e.g. an assumption for all UEs or just certain operators' UEs) or possibly determines this from subscription information if the UE is served by the home network or determines this from an indication in the MAP SLR or the address (e.g. SCCP E.164 address) to which the MAP SLR was routed. The GMLC 1008 stores a call record for the UE 1002 including all the information received in step 4. The GMLC 1008 assigns routing information, such as an IP Multimedia Routing Number (IMRN), to the call. Minimally, the IMRN enables call routing to the VCC DTF 1012 in steps 6 and 7 and, if needed, identifies the GMLC 1008. Optionally, the IMRN may also temporarily identify the call record stored in the GMLC 1008. The IMRN is used in later steps to select an LRF associated with the GMLC 1008 enabling the call record stored in the GMLC 1008 in this step to be retrieved by the LRF and enabling the LRF to locate the UE via the GMLC 1008. The GMLC 1008 returns a MAP Subscriber Location Report Ack. to the VMSC 1006 carrying the IMRN in the NA-ESRD or NA-ESRK or in some other new parameter. As such, the receipt of the routing information may be transparent to VMSC 1006 in that VMSC 1006 may utilize existing capability for support of the emergency call origination in the CS domain and does not need the addition of any new capability to support VCC. The GMLC 1008 may subsequently instigate a CS-MT-LR with the VMSC (not shown) to obtain either an interim location estimate for routing or an accurate location estimate for later provision to the PSAP. As an alternative, the MSC 1004 rather than GMLC 1008 could assign the IMRN and transfer this to the GMLC 1008 in step 4.
6. The VMSC 1006 routes the call based on the IMRN received in step 5. If the IMRN is conveyed using the existing NA-ESRK or NA-ESRD parameter then the call routing procedure in the VMSC 1006 can be the same as that used for normal emergency call origination in TS 23.271 (i.e. the IMRN appears like an ESRK or ESRD to the VMSC 1006). Based on IMRN routing, the VMSC 1006 routes the call to an MGCF 1006 in the visited network.
7. The MGCF 1006 initiates an INVITE towards an I-CSCF in the visited IMS (not shown) or possibly the MGCF 1006 routes directly to the E-CSCF 1010, an S-CSCF (not shown) or VCC DTF 1012. The INVITE contains the identity of the UE (e.g. MSISDN Tel URI as Contact address). The I-CSCF or S-CSCF (not shown) or E-CSCF 1010, based on the IMRN, instigates PSI based application server termination to the VCC DTF.
8. The VCC DTF 1012 anchors the incoming call leg and originates an outgoing leg by sending the INVITE to (or back to) the E-CSCF 1010. The INVITE carries information identifying an emergency call and carrying or enabling recovery of the IMRN.
9. Based, for example, on inclusion of IMRN information in step 8, the E-CSCF 1010 sends a retrieve location request to an LRF identified by or associated with the IMRN. The retrieve location request includes IMRN information and any UE identification received in step 8—e.g. an MSISDN Tel URI. The retrieve location request may further include an indication of VCC support and identification information for the VCC DTF 1012—e.g. the VDN and VDI.
10. Based on any UE identification received in step 9 (e.g. MSISDN) and/or on IMRN information, the LRF interacts with the GMLC 1008 and retrieves the call record stored by the GMLC in step 5. Using any interim location information already in the call record or any interim location obtained according to step 5, the LRF returns a PSAP address and possibly location information to the E-CSCF 1010. The LRF will provide the anchor point for further support of location and may copy the call record obtained from the GMLC as well as storing information received from the E-CSCF 1010 in step 9. The LRF may return correlation information (e.g. ESQK) to the E-CSCF identifying itself and the call record. The LRF may further interact with the GMLC to instigate a CS-MT-LR procedure with the VMSC (as defined in 3GPP TS 23.271) to obtain an accurate location estimate for the UE.
11. The E-CSCF 1010 uses the PSAP address provided in step 10 and sends on the call request including the location information and any correlation information to the emergency centre or PSAP (not shown). The call request is either sent via an MGCF/MGW into the PSTN (not shown) or is sent directly as a SIP INVITE towards an IP capable emergency centre or PSAP.
12. The rest of the call establishment procedure occurs between the UE 1002, VMSC 1006, VCC DTF 1012, E-CSCF 1010 and PSAP based on the VCC CS origination procedure described in TS 23.206.

The above procedure preserves support for existing PSAP routing options (e.g. using cell ID or an interim location estimate), does not necessarily require any new impacts to MSCs and supports accurate location retrieval by the PSAP in the manner currently defined in TS 23.271. It also enables CS originated emergency calls to be sent to IP capable PSAPs.

VI. C. Domain Transfer IMS to CS—Procedure A

Two alternative procedures are described to support domain transfer for an IMS emergency call from the IMS domain to the CS domain when the UE moves out of IMS coverage and into CS coverage. In procedure A, the VCC capable UE behaves as for normal VCC (described in TS 23.206) and originates a new call leg in the CS domain to the VCC DTF using the VDN obtained from the visited network using any of alternatives (e), (f), (g) or (h) described in above with respect to Negotiation of VCC Support.

Procedure A is applicable to a UE that has sufficient credentials to register in the new visited network supporting the CS domain and places limitations on the continuity of support for providing further UE location updates to the PSAP. However, the procedure has the advantage of being compatible from the UE perspective with IMS to CS domain transfer for normal VCC.

Figure 11:
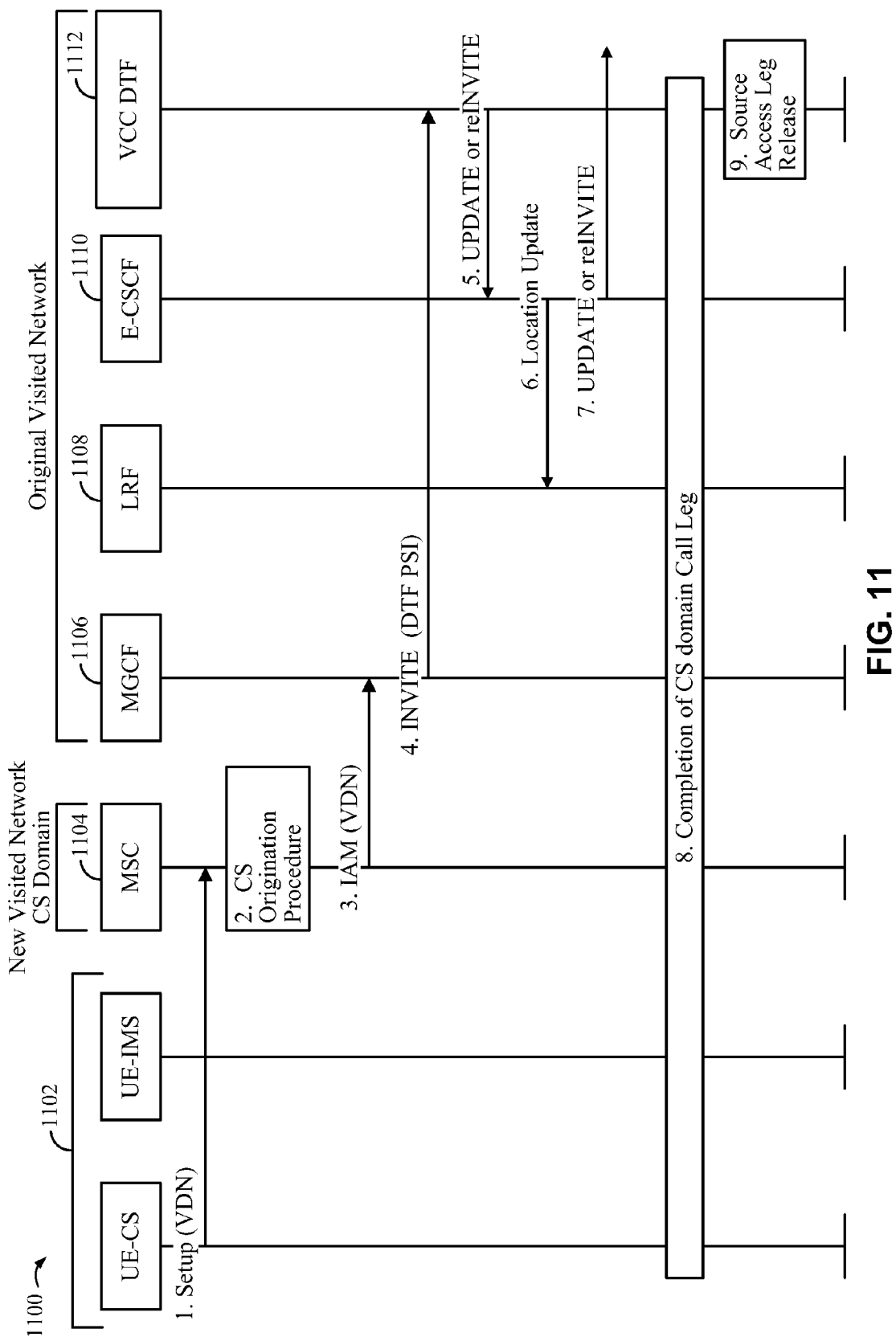
FIG. 11 is a schematic diagram of an aspect of a Procedure A for IMS to CS domain transfer.

Referring to FIG. 11, one aspect of a message flow procedure 1100 to support domain transfer for an IMS emergency call from the IMS domain to the CS domain when the UE moves out of IMS coverage and into CS coverage includes the following steps and actions.

1. If the user is not attached to the CS domain at the time when the UE 1102 determines a need for Domain Transfer to CS, the UE performs a CS Attach including a location update to its HLR/HSS. It subsequently originates a voice call in the CS domain by sending a DTAP SETUP message to a serving MSC or serving VMSC containing a VDN in the Called Party Number parameter. The VDN is the VDN obtained earlier from the original visited network to establish an Access Leg via the CS domain. It is assumed for this procedure that the UE 1102 can be authenticated in the CS domain. NOTE: because a normal call is originated, the domain transfer will not receive priority treatment in the new CS domain.
2. At the VMSC 1104, the originating call is processed as a normal CS call origination in the CS network.
3. The VMSC 1104 routes the call towards the original visited IMS network via an MGCF 1106 in the original visited network. NOTE: the VMSC 1104 is not aware of the emergency call or VCC support and thus will not perform a GMLC query as for CS emergency call origination. Continued support of location is described further down.
4. The MGCF 1106 initiates an INVITE towards an I-CSCF (not shown) in the original visited IMS or possibly the MGCF 1106 routes directly to the E-CSCF 1110, an S-CSCF (not shown) or VCC DTF 1112. The I-CSCF or S-CSCF (not shown) or E-CSCF 1110, based on the VDN, instigates PSI based application server termination to the VCC DTF 1112.
5. The DTF 1112 updates the outgoing Access Leg by communicating the SDP of the Access Leg established in the transferring-in domain to the remote end via the E-CSCF 1110. Access Leg update happens according to SIP session modification procedures in IETF RFC 3261. The DTF 1112 may also explicitly indicate domain transfer to the E-CSCF 1110 to allow the E-CSCF to notify the LRF 1108 in the next step.
6. The E-CSCF 1110 sends a Location Update to the anchor LRF 1108 with the new SDP information which may assist the LRF 1108 in identifying the type of domain transfer. Minimally the E-CSCF 1110 indicates to the LRF 1108 that there has been a CS domain transfer (e.g. this can be known by the DTF 1112 from use of a VDN rather than VDI and/or from domain transfer involving an MGCF 1106).
7. The update continues from the E-CSCF 1110 towards the PSAP (not shown) if IP capable or to an MGCF.
8. The new call leg in the transferring-in CS domain is established between the VCC DTF 1112, E-CSCF 1110 or S-CSCF if present, I-CSCF if present, MGCF, VMSC 1104 and UE 1102.
9. The previous incoming Access Leg which is the Access leg previously established over IMS is released. The UE 1102 should de-register if possible in the visited network P-CSCF and home network S-CSCF.

Continuing support of location after procedure A has transferred the UE to the CS domain may include the following procedures. If the PSAP sends a request to the anchor LRF to obtain the location of the UE, it may not be possible for the LRF to continue using the same procedure to obtain location as it may have been using (or expecting to use) while the UE was in the IMS domain. For example, if the LRF was using OMA SUPL based on UDP/IP or SIP Push initial transport between the LRF and UE, the loss of access to the PS domain by the UE following IMS to CS domain transfer may prevent further use of SUPL. In addition, the LRF may not be able to use the control plane location solutions defined in 3GPP TS 23.271 for CS emergency calls (e.g. in clause 9.1.3 of TS 23.271) because it may not know the VMSC address. However, the LRF could use the more general CS-MT-LR procedure described in clauses 9.1.1 and 9.1.2 of 3GPP TS 23.271 in which the LRF (behaving as or accessing a GMLC) obtains the VMSC address by querying the UE's home HLR/HSS. A disadvantage of this, however, is that the UE's HLR/HSS will need to support the CS-MT-LR query procedure and there may be billing issues between the visited network and home network (since the home network may not be aware of the emergency call significance). To avoid this disadvantage, MSC 1104 may convey the current serving cell of UE 1102 or its own identity in the ISUP IAM sent in step 3—e.g. in the form of a 10 digit number in the ISUP Generic Digits parameter. MGCF 1106 may convey this same information to VCC DTF 1112 in the SIP INVITE sent in step 4 (e.g. using a SIP URL parameter or some other SIP parameter). The information can then be conveyed to E-CSCF 1110 in step 5 and to LRF 1108 in step 6. LRF 1108 can then determine the identity of MSC 1104 and a suitable GMLC for any later location request and can make use of the GMLC to query location of UE 1102 from MSC 1104 using existing procedures in 3GPP TS 23.271.

VI. D. Domain Transfer IMS to CS—Procedure B

Procedure B enabling IMS to CS domain transfer may be applicable to a UE whether or not it has sufficient credentials to register in the new visited network and enables continuity of location support without limitation. However, it may have to be restricted to domain transfer between networks belonging to the same operator (e.g. networks sharing the same MCC and MNC). The procedure requires a new variant of VCC domain transfer in the UE in which knowledge of a VDN may not be needed.

Referring to FIG. 12, one aspect of a message flow procedure 1200 enabling IMS to CS domain transfer of IMS emergency calls includes the following steps and actions.

1. If the user is not attached to the CS domain at the time when the UE 1202 determines a need for Domain Transfer to CS, the UE 1202 may perform a CS Attach if it contains the necessary credentials. It subsequently originates an emergency voice call in the CS domain by sending an Emergency Setup message to the VMSC (as defined in 3GPP TS 24.008). The Emergency Setup may indicate that the UE 1202 supports VCC and may further indicate that this is a request for domain transfer. As an alternative, the UE 1202 may send a normal Setup message carrying a modified VDN in the called party number parameter.

2. If the UE 1202 sent an Emergency Setup message in step 1, then based on normal handling for all CS emergency calls (e.g. as described in TS 23.271) or based on assumed VCC support according to the UE's home network operator or based on an explicit indication of VCC support in the Emergency Setup message, the VMSC 1204 sends a MAP Subscriber Location Report (SLR) to a GMLC 1208 associated with the emergency service provider (PSAP) to which the call would normally be sent (e.g. based on the current serving cell or SAI). Alternatively, if the UE 1202 sent a normal Setup message in step 1 carrying a modified VDN, the MSC 1204 may recognize the VDN as signifying a domain transfer request for an existing emergency call and similarly send a MAP SLR to the GMLC 1208. The MAP SLR carries the same information as that which would be sent for a normal emergency call origination (e.g. as in step 4 in FIG. 10) including the IMSI, MSIDN, IMEI, VMSC address and serving cell identity or SAI. No location estimate is included. The message may carry any indication of VCC support and whether for a domain transfer that was received in the Emergency Setup. This indication could be an explicit parameter or parameter value in the MAP SLR or it could be associated with a distinct SCCP E.164 address (associated with the GMLC) to which the MAP SLR is routed.

3. Based on local policy or based on an explicit indication of VCC support and request for a domain transfer received in the MAP SLR or based on the address (e.g. SCCP E.164 address) to which the MAP SLR was routed, the GMLC 1208 interacts with an associated LRF (e.g. which may be within the same physical entity) to search for the call record for the UE 1202 that was originally established in the anchor LRF (e.g. using the procedure illustrated by FIG. 9 or 10). The anchor LRF may use the IMSI, MSISDN and/or IMEI received in step 2 to identify the correct call record. Note that in the case of an unauthenticated emergency call, the IMEI would have to be used to identify the call record which is an item for further study since the identification cannot be completely reliable. If no call record is found and no indication was received in or associated with the MAP SLR that this was a request for domain transfer, the GMLC should assume that this is a new emergency call and proceed as in FIG. 10. However, if no call record is found and the MAP SLR does indicate a request for domain transfer, the GMLC 1208 should return a MAP SLR return error response or some other error message to cause rejection of the domain transfer request by the VMSC, in which case the UE 1202 must continue with the call in the IMS domain or release the call if that is not possible. Otherwise, if the call record is found, the GMLC 1208 returns a MAP Subscriber Location Report Ack. to the VMSC 1204 carrying the VDN (note different to any modified VDN received in step 1) needed to establish the new access leg. This VDN would have been obtained by the LRF when the call was first originated (e.g. in step 7 in FIG. 9 or step 9 in FIG. 10). The VDN could be carried by the existing NA-ESRK or existing NA-ESRD parameter in the MAP Subscriber Location Report ack. The GMLC 1208 also stores the information received from the VMSC 1204 in step 2.

4. The VMSC 1204 routes the new leg based on the VDN received in step 3. If the VDN is conveyed using the existing NA-ESRK or NA-ESRD parameter then the call routing procedure can be the same as that used for normal emergency call origination (i.e. there would be no additional VMSC impact). Based on VDN routing, the VMSC 1204 routes the call towards the original visited IMS network via an MGCF 1206 in the original visited network.

5. The MGCF 1206 initiates an INVITE towards an I-CSCF (not shown) in the original visited IMS or possibly the MGCF 1206 routes directly to the E-CSCF 1210, an S-CSCF (not shown) or VCC DTF 1212. The I-CSCF or S-CSCF (not shown) or E-CSCF 1210, based on the VDN, instigates PSI based application server termination to the VCC DTF 1212.

6. The DTF 1212 updates the outgoing Access Leg by communicating the SDP of the Access Leg established in the transferring-in domain to the remote end via the E-CSCF 1210. Access Leg update happens according to SIP session modification procedures in IETF RFC 3261. The DTF 1212 may also explicitly indicate CS domain transfer to the E-CSCF 1210.

7. The E-CSCF 1210 sends a Location Update to the anchor LRF 1208 with the new SDP information. Minimally the E-CSCF 1210 indicates to the LRF 1208 that there has been a CS domain transfer. The LRF 1208 correlates this indication with the indication of domain transfer determined in step 3 and determines that the UE 1202 has now changed domain to that indicated in step 2. The LRF 1208 communicates this information to the GMLC 1208 (not necessarily in the same entity) selected by the VMSC 1204 in step 2.

8. The update continues from the E-CSCF 1210 towards the PSAP or MGCF (not shown).

9. The new call leg in the transferring-in CS domain is established between the VCC DTF 1212, E-CSCF 1210 or S-CSCF if present, I-CSCF if present, MGCF 1206, VMSC 1204 and UE 1202.

10. The source Access Leg which is the Access leg previously established over IMS is released. The UE 1202 should de-register if possible in the visited network P-CSCF (not shown) and home network S-CSCF (not shown).

Besides possibly allowing domain transfer for unregistered UEs, procedure B also enables the anchor LRF to make use of the normal location procedure defined in 3GPP TS 23.271 (e.g. in clause 9.1.3) to locate a UE that has originated an emergency call. This is enabled due to steps 2 and 3 in FIG. 12 in which the VMSC obtains and stores information concerning the GMLC, and the LRF and GMLC obtain and store information concerning the VMSC. This then permits a CS-MT-LR without the need to query the UE's home HSS/HLR.

A further aspect of procedure B is that the call origination procedure at the VMSC can be identical or almost identical to that for a normal emergency call as described in TS 23.271 or identical or almost identical that for VCC support for a CS originated emergency call as described for the procedure in FIG. 10. From the perspective of the GMLC, the procedure is also almost identical to that for a normal emergency call with regard to the MAP signaling transaction with the VMSC.

However, procedure B does depend on the GMLC and LRF finding the original call record in step 3. This seems to be possible provided the GMLC and LRF belong to the same operator—e.g. because then the GMLC and LRF could be part of the same physical entity or could at least be interconnected. But if the original call record is not found and there is no explicit or implicit indication of a domain transfer in the Emergency Setup message, the GMLC will assume that this is a new emergency call and not a domain transfer resulting in connection of the user to a new PSAP operator. This disadvantage can be averted, however, by including VCC and domain transfer indications in the Emergency Setup and MAP SLR messages as described above.

VI. E. Domain Transfer CS to IMS—Procedure C

Two alternative procedures are described to support domain transfer for an emergency call from the CS domain to the IMS domain. In Procedure C described here, the VCC capable UE behaves as for normal VCC (as described in 3GPP TS 23.206) and originates a new call leg in the IMS domain to the VCC DTF using the VDI obtained from the visited network using any of alternatives (e), (f), (g) or (h) described herein previously. The call is treated like a normal originating SIP call and thus is only applicable to a UE that has sufficient credentials to register in the new visited network.

Figure 13:
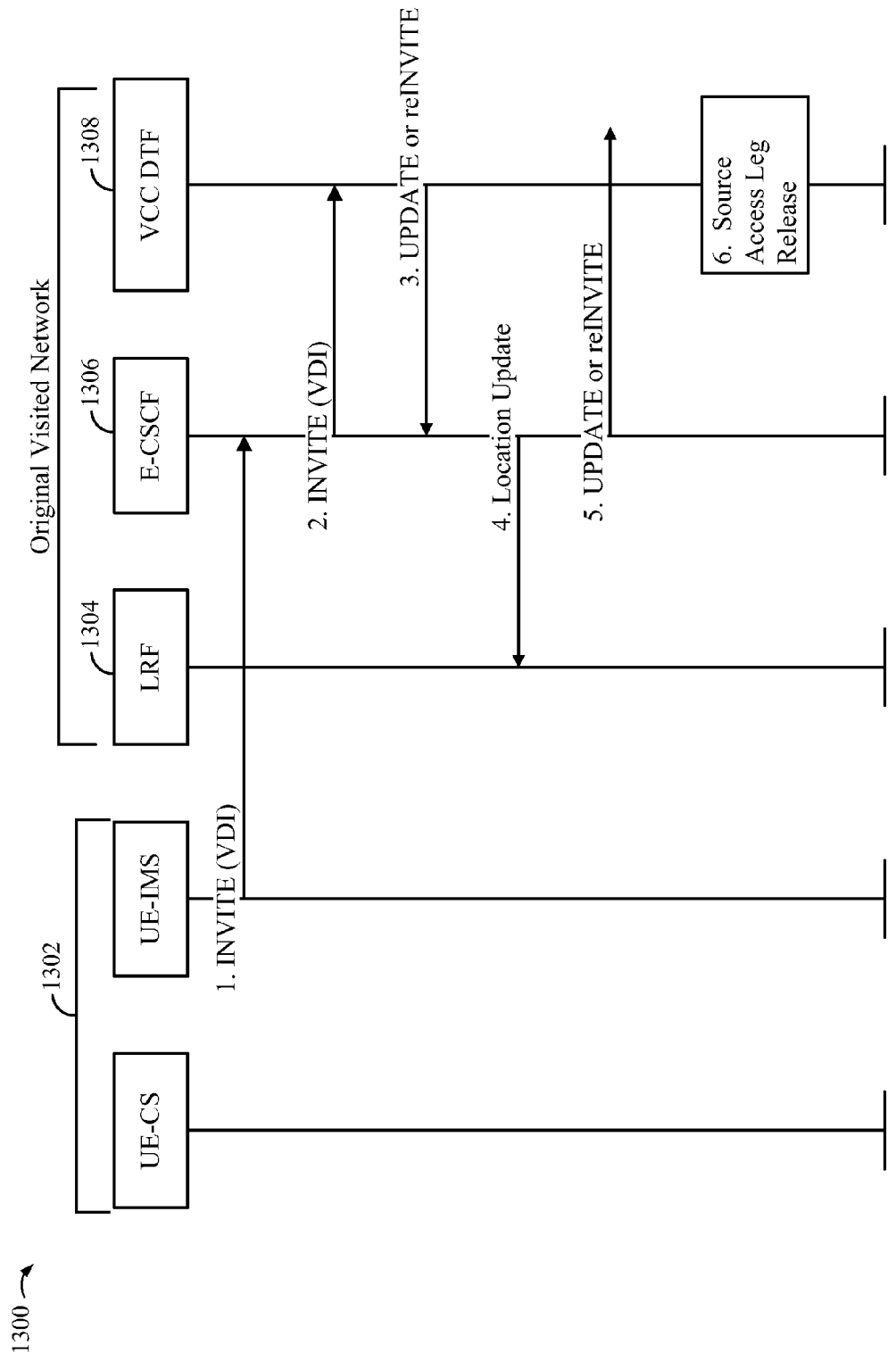
FIG. 13 is a schematic diagram of an aspect of a Procedure C for CS to IMS domain transfer.

Referring to FIG. 13, one aspect of a message flow procedure 1300 for a domain transfer from a CS domain to an IMS domain includes the following steps and actions.

1. If the user is not registered with IMS at the time when the UE 1302 determines a need for Domain Transfer to IMS, the UE 1302 initiates Registration with IMS as specified in 3GPP draft TS 23.206. It subsequently initiates an IMS originated session toward the DTF 1308 in the original visited network using the VDI obtained earlier from the visited network (e.g. as described above with respect to IMS Call Origination and in FIGS. 9 and 10) to establish an Access Leg via IMS and request Domain Transfer of the active CS session to IMS. Due to normal call handling, the SIP INVITE may be routed through a P-CSCF in either the new visited network or home network (not shown) and an S-CSCF in the home network (not shown) and will eventually reach either an S-CSCF (not shown) or the E-CSCF 1306 in the original visited network. NOTE: because a normal call is originated, the domain transfer will not receive priority treatment in the new IMS domain.

2. The IMS session is processed at an S-CSCF (not shown) or the E-CSCF 1306 in the original visited network and delivered to the VCC DTF 1308.

3. The DTF 1308 completes the establishment of the new incoming Access Leg via IMS. The DTF 1308 performs the Domain Transfer by updating the Remote Leg with connection information of the newly established Access Leg using the Access Leg Update procedure as specified in 3GPP TS 23.206. The UPDATE or ReINVITE is sent to the E-CSCF 1306 used to originate the call (e.g. according to FIG. 9 or 10). The DTF 1308 may also explicitly indicate domain transfer to the E-CSCF 1306.

4. The E-CSCF 1306 updates the anchor LRF 1304 with the new SDP information e.g. indicates that the UE 1302 is now using the IMS domain and provides the UE IP address.

5. The update continues from the E-CSCF 1306 towards the PSAP or MGCF (not shown).

6. The source Access Leg which is the Access leg previously established over CS is subsequently released as specified in 3GPP TS 23.206. This includes releasing the previous incoming CS leg through the E-CSCF 1306.

Once procedure C has been completed, it will be possible to continue location support for the UE because the LRF should now have the UE's IP address and can thus invoke OMA SUPL (or any other solution involving IP transport). Use of the 3GPP control plane solution to enable location of the UE for GPRS access may be possible using the more general PS-MT-LR procedure described in clauses 9.1.1 and 9.1.6 of 3GPP TS 23.271 in which the LRF queries the UE's home HLR/HSS for the visited SGSN address.

VI. F. Domain Transfer CS to IMS—Procedure D

In another aspect, Procedure D supporting CS to IMS domain transfer may not require use of a VDI and places fewer restrictions on continued location support. However, it may have to be restricted to domain transfer between networks owned and managed by the same operator as for procedure B.

Figure 14:
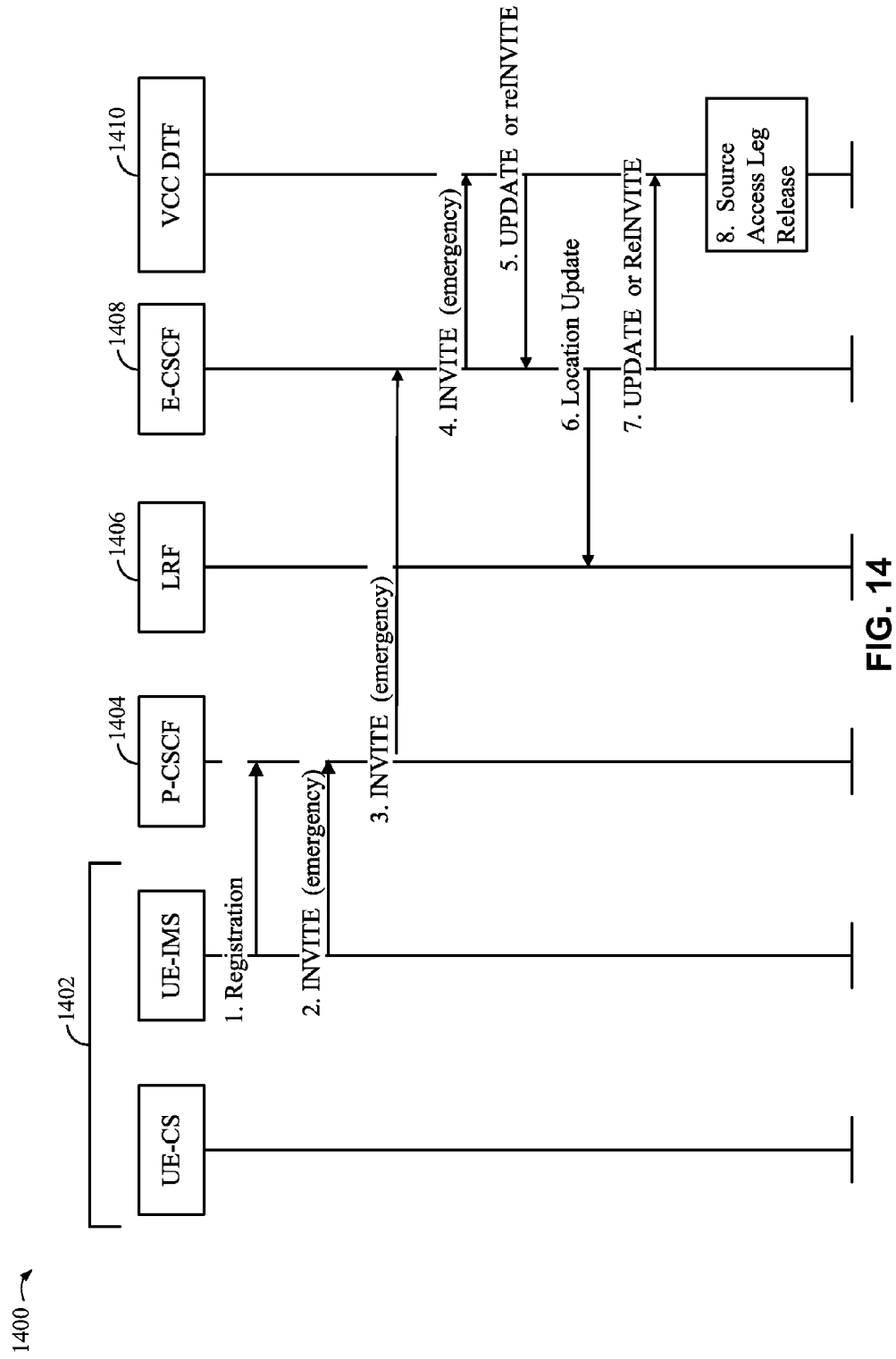
FIG. 14 is a schematic diagram of an aspect of a Procedure D for CS to IMS domain transfer.

Referring to FIG. 14, one aspect of a message flow procedure 1400 for supporting CS to IMS domain transfer includes the following steps and actions.

1. Prior to sending the INVITE, the UE 1402 executes an emergency registration in the new visited IMS network if it contains adequate credentials as defined in 3GPP TS 23.167 (i.e. a normal registration is not used). This will be needed to support call back to the UE 1402 (via the new visited network) and to authenticate the UE 1402 in the new visited IMS.

2. The UE 1402 then sends an INVITE with an emergency indication to the visited network P-CSCF 1404. The INVITE should contain identification information for the UE 1402—e.g. MSISDN Tel URI or public user SIP URI. The INVITE may indicate that the UE 1402 supports VCC and may indicate that this is a request for domain transfer as opposed to a call origination. This indication may be conveyed in a modified VDI carried in the SIP To header field—in which case no separate emergency indication may be needed.

3. Based on knowledge or assumption of VCC support according to alternatives (a), (b) or (c) as described above in Negotiation of VCC Support, or based on an indication of VCC support in the INVITE (e.g. via inclusion of a modified VDI), the P-CSCF 1404 forwards the SIP INVITE to an E-CSCF 1408.

4. The E-CSCF 1408 based on assumption or knowledge or an indication of VCC support forwards the SIP INVITE to a VCC DTF 1410.

5. The VCC DTF 1410 finds the original call record—e.g. as established according to step 5 in FIG. 9. The DTF 1410 then updates the outgoing Access Leg by communicating the SDP of the Access Leg established in the transferring-in domain to the remote end via the E-CSCF 1408. The DTF 1410 may also explicitly indicate domain transfer to the E-CSCF 1408. If the VCC DTF 1410 does not find the original call record and no indication was received in the INVITE that this was a request for domain transfer, VCC DTF 1410 could assume that this is a new emergency call (not a domain transfer) and proceed as in step 6 in FIG. 9. However, if no call record is found and the INVITE does indicate a request for domain transfer, the VCC DTF 1410 should reject the domain transfer request by returning some error message to the UE, in which case the UE 1402 must continue with the call in the CS domain or release the call if that is not possible.

6. The E-CSCF 1408 updates the anchor LRF 1406 with the new SDP information—e.g. indicates that the UE 1402 is now using the IMS domain and provides the UE IP address.

7. The update continues from the E-CSCF 1408 towards the PSAP or MGCF (not shown).

8. The source Access Leg which is the Access leg previously established over CS is subsequently released as specified in 3GPP draft TS 23.206. This includes releasing the previous incoming CS leg through the E-CSCF 1408.

Continuing location support can be the same as that for procedure C—e.g. by using OMA SUPL with the UE IP address provided to the anchor LRF in step 5 or using the 3GPP PS-MT-LR procedure for location with GPRS access. However, as an added benefit, it may be possible to use the 3GPP PS-NI-LR and PS-MT-LR procedures specific to emergency calls defined in 3GPP TS 23.271 (in clauses 9.1.6A and 9.1.7). This can be enabled if the UE indicates an emergency call for GPRS access and/or GPRS PDP context establishment. This can trigger the SGSN into instigating a PS-NI-LR either to obtain location or provide its address to a GMLC. If the GMLC is associated with the anchor LRF, it will be possible to provide the anchor LRF with the SGSN address thereby enabling use of a PS-MT-LR without having to query the home HLR/HSS (and also allowing location for an unauthorized UE with possibly no HLR/HSS).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Further, an apparatus such as at least one network-side component or a user terminal may be configured to perform the functions described above using at least one processor operable to execute instructions to perform the respective action. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method to support Voice Call Continuity (VCC) for emergency calls in a wireless access environment, comprising:
receiving, at a serving domain, a message containing emergency and domain transfer information from a user equipment (UE), wherein the domain transfer information comprises one or more bits configured to distinguish a new emergency call origination with an indication of UE VCC capability from a domain transfer of an existing emergency call;
determining a need for either emergency call origination or domain transfer based on the emergency and domain transfer information; and
performing either the emergency call origination or the domain transfer based on the determining.

2. The method of claim 1, wherein the emergency and domain transfer information comprises a modified Voice Domain Transfer Number (VDN).

3. The method of claim 2, wherein the message is a 3GPP Direct Transfer Application Part (DTAP) SETUP message and the modified VDN is an E.164 number in the Called Party Number parameter.

4. The method of claim 1, wherein the emergency and domain transfer information comprises a modified Voice Domain Transfer SIP URI (VDI).

5. The method of claim 4, wherein the message is a Direct Transfer Application Part (DTAP) INVITE and the modified VDI is a SIP Uniform Resource Identifier (URI).

6. The method of claim 1, wherein the message is a 3GPP Direct Transfer Application Part (DTAP) Emergency SETUP message and the emergency and domain transfer information comprise spare bits in an optional Service Category parameter.

7. The method of claim 1, wherein the serving domain is a circuit-switched (CS) serving domain.

8. The method of claim 7, further comprising including a serving cell identification (ID) or MSC identity in an ISUP Initial Address Message (IAM) used to perform the Domain Transfer.

9. The method of claim 8, wherein the serving cell ID or MSC identity is included in a Generic Digits parameter in the IAM.

10. The method of claim 1, wherein the serving domain is a packet-switched (PS) serving domain.

11. The method of claim 1, further comprising:,
receiving the message in a serving Mobile Switching Center (MSC) in the serving domain; and
assigning at least two addresses to a Gateway Mobile Location Center (GMLC) in the serving domain for signaling with the serving MSC relating to the emergency call origination and the domain transfer request, respectively.

12. The method of claim 11, wherein the at least two addresses comprise two Skinny Call Control Protocol (SCCP) E.164 addresses.

13. The method of claim 12, wherein the GMLC is eon fired to determine routing information in response to a query received from the serving MSC based on which SCCP address assigned to the query.

14. The method of claim 13, wherein the routing information comprises an Emergency Services Routing Digit (ESRD) or an Emergency Service Routing Key (ESRK).

15. The method of claim 14, wherein the sending of the query to the GMLC and the receipt of the routing information from the GMLC is transparent to the serving MSC.

16. The method of claim 13, wherein the query is a MAP Subscriber Location Report (SLR) and the emergency call origination or domain transfer request is included in an optional parameter of the MAP SLR.

17. The method of claim 1, wherein the indication of UE VCC capability indicates that whether the UE supports VCC.

18. The method of claim 1, wherein the performing of the emergency call origination includes anchoring the emergency call in a VCC Domain Transfer Function (DTF).

19. The method of claim 18, wherein the VCC DTF returns a modified VDI and a modified VDN to the UE.

20. The method of claim 19, wherein the modified VDI and the modified VDN are returned to the UE in a SIP 200 OK message.

21. The method of claim 1, wherein the performing of the domain transfer includes finding a call record for the UE in a VCC Domain Transfer Function (DTF).

22. The method of claim 21, further comprising returning an error message to the UE if the call record is not found.

23. An apparatus configured to support Voice Call Continuity (VCC) for emergency calls in a wireless access environment, comprising:
  means for receiving a message containing emergency and domain transfer information from a user equipment (UE), wherein the domain transfer information comprises one or more bits configured to distinguish a new emergency call origination with an indication of UE VCC capability from a domain transfer of an existing emergency call;
  means for determining a need for either emergency call origination or domain transfer based on the emergency and domain transfer information; and
  means for performing either the emergency call origination or the domain transfer based on the determining.

24. An apparatus to support Voice Call Continuity (VCC) for emergency calls in a wireless access environment, comprising:
  at least one processor operable to execute instructions to:
    receive, at a serving domain, a message containing emergency and domain transfer information from a user equipment (UE), wherein the domain transfer information comprises one or more bits configured to distinguish a new emergency call origination with an indication of UE VCC capability from a domain transfer of an existing emergency call;
    determine a need for either emergency call origination or domain transfer based on the emergency and domain transfer information; and
    perform either the emergency call origination or the domain transfer based on the determining.

25. The apparatus of claim 24, wherein the emergency and domain transfer information comprises a modified Voice Domain Transfer Number (VDN).

26. The apparatus of claim 25, wherein the message is a 3GPP Direct Transfer Application Part (DTAP) SETUP message and the modified VDN is an E.164 number in the Called Party Number parameter.

27. The apparatus of claim 24, wherein the emergency and domain transfer information comprises a modified Voice Domain Transfer SIP URI (VDI).

28. The apparatus of claim 27, wherein the message is a Session Initiation Protocol (SIP) INVITE and the modified VDI is a SIP Uniform Resource Identifier (URI).

29. The apparatus of claim 24, wherein the message is a 3GPP Direct Transfer Application Part (DTAP) Emergency SETUP message and the emergency and domain transfer information comprise spare bits in the optional Service Category parameter.

30. The apparatus of claim 24, wherein the serving domain is a circuit-switched (CS) serving domain.

31. The apparatus of claim 30, further comprising including a serving cell identification (ID) or MSC identity in an ISUP Initial Address Message (IAM) used to perform the Domain Transfer.

32. The apparatus of claim 31, wherein the serving cell ID or MSC identity is included in a Generic Digits parameter in the IAM.

33. The apparatus of claim 24, wherein the serving domain is a packet-switched (PS) serving domain.

34. The apparatus of claim 24, further comprising:
  receiving the message in a serving MSC in the serving domain; and
  assigning at least two addresses to a Gateway Mobile Location Center (GMLC) in the serving domain for signaling with the serving MSC relating to the emergency call origination and the domain transfer request, respectively.

35. The apparatus of claim 34, wherein the at least two addresses comprise two Skinny Call Control Protocol (SCCP) E.164 addresses.

36. The apparatus of claim 35, wherein the GMLC is configured to determine routing information in response to a query received from the serving MSC based on which SCCP address assigned to the query.

37. The apparatus of claim 36, wherein the routing information comprises an Emergency Services Routing Digit (ESRD) or an Emergency Service Routing Key (ESRK).

38. The apparatus of claim 37, wherein the sending of the query to the GMLC and the receipt of the routing information from the GMLC is transparent to the serving MSC.

39. The apparatus of claim 36, wherein the query is a MAP Subscriber Location Report (SLR) and the emergency call origination or domain transfer request is included in an optional parameter of the MAP SLR.

40. The apparatus of claim 24, wherein the indication of UE VCC capability indicates that whether the UE supports VCC.

41. The apparatus of claim 24, wherein the performing of the emergency call origination includes anchoring the emergency call in a VCC Domain Transfer Function (DTF).

42. The apparatus of claim 41, wherein the VCC DTF returns a modified VDI and a modified VDN to the UE.

43. The apparatus of claim 42, wherein the modified VDI and the modified VDN are returned to the UE in a SIP 200 OK message.

44. The apparatus of claim 24, wherein the performing of the domain transfer includes finding a call record for the UE in a VCC Domain Transfer Function (DTF) DTF.

45. The apparatus of claim 44, further comprising returning an error message to the UE if the call record is not found.

46. A method to support Voice Call Continuity (VCC) for emergency calls in a wireless access environment, comprising:
  receiving, at a serving domain, a message containing emergency and domain transfer information from a user equipment (UE), wherein the domain transfer information comprises at least one VCC indicator bit of one or more unused message bits that explicitly indicates whether the UE supports VCC, wherein the serving domain is a circuit-switched (CS) serving domain;
  determining, based on the domain transfer information, a need for either emergency call origination or domain transfer based on the emergency and domain transfer information; and
  performing either the emergency call origination or the domain transfer based on the determining;
  wherein receiving the message further comprises receiving the message in a serving Mobile Switching Center (MSC) in the serving domain, wherein the serving MSC sends a query to a Gateway Mobile Location Center (GMLC) in the serving domain, wherein the query includes an emergency call origination request or a domain transfer request, wherein the GMLC returns routing information to the serving MSC based on the emergency call origination or the domain transfer request; and wherein the GMLC possesses two Skinny Call Control Protocol (SCCP) E.164 addresses, wherein the serving MSC sends the query to one address if the emergency and domain transfer information indicates an emergency call origination and to the other address if the emergency and domain transfer information indicates a domain transfer, wherein the one address indicates the emergency call origination and the other address indicates the domain transfer request.

47. An apparatus to support Voice Call Continuity (VCC) for emergency calls in a wireless access environment, comprising:

at least one processor operable to execute instructions to:
receive, at a serving domain, a message containing emergency and domain transfer information from a user equipment (UE), wherein the domain transfer information comprises at least one VCC indicator bit of one or more unused message bits that explicitly indicates whether the UE supports VCC, wherein the serving domain is a circuit-switched (CS) serving domain;

determine, based on the domain transfer information, a need for either emergency call origination or domain transfer based on the emergency and domain transfer information; and perform either the emergency call origination or the domain transfer based on the determining.

wherein the instructions to receive further comprise instructions to receive the message in a serving MSC in the serving domain, wherein the serving Mobile Switching Center (MSC) sends a query to a Gateway Mobile Location Center (GMLC) in the serving domain, wherein the query includes an emergency call origination request or a domain transfer request, wherein the GMLC returns routing information to the serving MSC based on the emergency call origination or the domain transfer request; and wherein the GMLC possesses two Skinny Call Control Protocol (SCCP) E.164 addresses, wherein the serving MSC sends the query to one address if the emergency and domain transfer information indicates an emergency call origination and to the other address if the emergency and domain transfer information indicates a domain transfer, wherein the one address indicates the emergency call origination and the other address indicates the domain transfer request.

* * * * *